United States Patent
Li et al.

(10) Patent No.: US 11,557,793 B2
(45) Date of Patent: Jan. 17, 2023

(54) FLEXIBLE ALL-SOLID-STATE LITHIUM-ION SECONDARY BATTERY HAVING GELABLE SYSTEM CONTAINING LITHIUM SALT AND ETHER COMPOUND, AND PREPARATION METHOD THEREOF

(71) Applicant: BEIJING NORMAL UNIVERSITY, Beijing (CN)

(72) Inventors: Lin Li, Beijing (CN); Fengquan Liu, Beijing (CN); Jianjun Zhou, Beijing (CN)

(73) Assignee: BEIJING NORMAL UNIVERSITY, Beijing (CN)

( * ) Notice: Subject to any disclaimer, the term of this patent is extended or adjusted under 35 U.S.C. 154(b) by 276 days.

(21) Appl. No.: 16/696,570

(22) Filed: Nov. 26, 2019

(65) Prior Publication Data

US 2020/0099090 A1    Mar. 26, 2020

Related U.S. Application Data

(63) Continuation-in-part of application No. PCT/CN2018/088495, filed on May 25, 2018.

(30) Foreign Application Priority Data

May 26, 2017 (CN) .......................... 201710385193.0
May 26, 2017 (CN) .......................... 201710386080.2

(51) Int. Cl.
*H01M 10/058* (2010.01)
*H01M 10/0525* (2010.01)
*H01M 10/0565* (2010.01)

(52) U.S. Cl.
CPC ..... *H01M 10/058* (2013.01); *H01M 10/0525* (2013.01); *H01M 10/0565* (2013.01); *H01M 2300/0085* (2013.01)

(58) Field of Classification Search
CPC ........... H01M 10/058; H01M 10/0525; H01M 10/0565
(Continued)

(56) References Cited

U.S. PATENT DOCUMENTS

| | | | |
|---|---|---|---|
| 2003/0003367 A1* | 1/2003 | Roh | H01M 10/058 |
| | | | 429/300 |
| 2011/0143174 A1* | 6/2011 | Kim | H01M 10/0565 |
| | | | 429/50 |
| 2013/0101884 A1 | 4/2013 | Ueda | |

FOREIGN PATENT DOCUMENTS

| | | |
|---|---|---|
| CN | 1716681 A | 1/2006 |
| CN | 101475663 A | 7/2009 |

(Continued)

OTHER PUBLICATIONS

Hwang et al., Room temperature cross-linkable gel polymer electrolytes for lithium ion batteries by in situ cationic polymerization of divinyl ether, 2010, Electrochemistry Communications, 12, 916-919 (Year: 2010).*

(Continued)

*Primary Examiner* — Sean P Cullen
(74) *Attorney, Agent, or Firm* — Novick, Kim & Lee, PLLC; Allen Xue

(57) ABSTRACT

A flexible all-solid-state lithium-ion secondary battery is prepared by placing a positive electrode and a negative electrode or optionally a separator of the lithium-ion secondary battery in a gelable system in which a solid electrolyte has not yet formed by a way of infiltration or coating, so that the surfaces and the interiors of the positive and negative electrodes are infiltrated by the gelable system, which also fills the voids inside the positive and negative electrodes. When the gelable system is solidified to form the solid electrolyte, it can form the solid electrolyte in situ on the surfaces and interiors of the positive and negative (Continued)

electrodes. The lithium-ion secondary battery prepared by the method can form a conductive network inside the entire battery, which can not only extremely reduce the internal resistance of the lithium-ion secondary battery, thereby improving the conductivity and rate capability, but also solve the potential safety hazard problem caused by liquid electrolytes.

15 Claims, 5 Drawing Sheets

(58) Field of Classification Search
USPC .......................................... 29/623.1; 429/127
See application file for complete search history.

(56) References Cited

FOREIGN PATENT DOCUMENTS

| | | | |
|---|---|---|---|
| CN | 102119462 A | | 7/2011 |
| CN | 102130364 A | | 7/2011 |
| CN | 103811802 A | | 5/2014 |
| CN | 105529497 A | * | 4/2016 |
| CN | 103000941 B | | 6/2016 |
| CN | 105789694 A | | 7/2016 |
| CN | 105811007 A | | 7/2016 |
| CN | 105914405 A | | 8/2016 |
| CN | 106328955 A | | 1/2017 |
| CN | 106532115 A | * | 3/2017 |
| CN | 106575775 A | | 4/2017 |
| CN | 106663835 A | | 5/2017 |
| EP | 3637523 A1 | | 4/2020 |
| JP | H11265693 A | | 9/1999 |
| JP | 2001202996 A | | 7/2001 |
| JP | 2002343435 A | | 11/2002 |
| JP | 2003092140 A | * | 3/2003 .......... H01M 10/052 |
| JP | 2013194112 A | | 9/2013 |
| JP | 2014056822 A | | 3/2014 |
| JP | 2014211949 A | * | 11/2014 ........ H01M 10/0567 |
| JP | 2016162543 A | | 9/2016 |
| KR | 20130119841 A | * | 11/2013 ........ H01M 10/0565 |
| KR | 20140078027 A | * | 6/2014 .............. H01M 4/13 |

OTHER PUBLICATIONS

Kim et al., In Situ Formation of Protective Coatings on Sulfur Cathodes in Lithium Batteries with LiFSI-Based Organic Electrolytes, 2015, Advanced Energy Materials, 5, 1401792 (Year: 2015).*
Akbulut et al., Conductivity hysteresis in polymer electrolytes incorporating poly(tetrahydrofuran), 2007, Electrochimica Acta, 52, 1983-1989 (Year: 2007).*
Porcarelli, Luca et al.; "Super Soft All-Ethylene Oxide Polymer Electrolyte for Safe All- Solid Lithium Batteries" Scientific Reports; vol. 6, No. 1; Jan. 21, 2016; pp. 1-14.
CN201710385193.0 First Office Action; The State Intellectual Property Office of People's Republic of China; dated Aug. 28, 2019.
CN201710385193.0 The Second Office Action; The State Intellectual Property Office of People's Republic of China; dated Jun. 2, 2020.
CN201710386080.2 First Office Action; The State Intellectual Property Office of People's Republic of China; dated Sep. 12, 2019.
CN201710386080.2 The Second Office Action; The State Intellectual Property Office of People's Republic of China; dated Jun. 2, 2020.
EP18806570.0 European Search Report; European Patent Office; dated Feb. 1, 2021.
JP2020515815 Notice of Reasons for Refusal; Japan Patent Office; dated Mar. 7, 2022.
JP2020515815 Notice of Reasons for Refusal; Japan Patent Office; dated Jun. 21, 2022.
CN 201710385193.0 OA1, Aug. 28, 2019, CNIPA.
CN 201710385193.0 OA2, Jun. 2, 2020, CNIPA.
CN 201710386080.2 OA1, Sep. 12, 2019, CNIPA.
CN 201710386080.2 OA2, Jun. 2, 2020, CNIPA.
JP 2020-515815, OA1, Mar. 7, 2022, JPO.
JP 2020-515815, OA2, Jun. 21, 2022, JPO.
EP 18806570.0, EESR, Feb. 1, 2021, EPO.

* cited by examiner

FLEXIBLE ALL-SOLID-STATE LITHIUM-ION SECONDARY BATTERY HAVING GELABLE SYSTEM CONTAINING LITHIUM SALT AND ETHER COMPOUND, AND PREPARATION METHOD THEREOF

CROSS-REFERENCE TO RELATED APPLICATIONS

The instant application is a continuation-in-part application of PCT international application No. PCT/CN2018/088495, filed on May 25, 2018, which claims the benefit of the Chinese patent application Nos. 201710385193.0, and 201710386080.2, all filed on May 26, 2017, the entire disclosures of which are hereby incorporated by reference.

TECHNICAL FIELD

The present invention belongs to the field of lithium-ion battery, and relates to a flexible all-solid-state lithium-ion secondary battery and preparation method thereof.

BACKGROUND ART

Advances in science and technology promote the rapid development of lithium-ion secondary batteries that provide electrical energy for daily practice electronic products. However, potential safety hazards that are not undetermined exist during using lithium-ion secondary batteries, such as leakage, combustion, explosion of electrolytes, etc. The batteries should be safe in order to satisfy people's normal production and life, so the safety of lithium-ion secondary batteries is also a hot topic explored by researchers. At present, the main solution to solve the electrolyte leakage problem of lithium-ion secondary batteries is to use solid electrolytes, which have advantages that liquid electrolytes cannot compare to, and are likely to become a technical approach to solve the safety problem of lithium-ion secondary batteries. Moreover, all-solid-state lithium-ion secondary batteries have great advantages in widening the operating temperature range, increasing energy densities of batteries, prolonging service life, etc., compared to lithium-ion secondary batteries with liquid electrolyte.

Based on differences in components of solid electrolytes, solid electrolytes can be classified into polymer composite lithium-ion electrolytes and all-solid-state thin-film lithium-ion electrolytes. Wherein, the polymer composite lithium-ion electrolytes mainly use macromolecular polymers to form coordination structures with lithium salts, thus realizing the conduction of lithium ion. To improve the conductivity of lithium ion, a certain amount of inorganic fillers, such as silica ($SiO_2$), alumina ($Al_2O_3$), zeolite, etc., are often added.

At present, the reported method for applying solid electrolytes in lithium-ion secondary batteries is generally to place solid electrolyte membranes between positive and negative electrodes. Although this preparation method can effectively block the contact between the positive and negative electrodes, it is impossible to overcome interface resistance between the solid electrolytes and the positive electrodes as well as interface resistance between the solid electrolytes and the negative electrodes. Moreover, because the electrolytes are solid-state thin membranes, it prevents sufficient contact between the interiors of the electrodes and the solid electrolytes. Hence, the prepared lithium-ion secondary batteries have shortcomings, such as poor conductivity, high interface internal resistance, low rate capability, etc.

Furthermore, the currently used all-solid-state lithium-ion secondary batteries are rigid, which have the disadvantages such as heavy weight, fragility, low strain ability, poor restorability, poor electrochemical performance, poor cycling performance, short battery life, etc.

SUMMARY OF THE INVENTION

To solve the above problems of the prior art, an object of the present invention is to provide a flexible all-solid-state lithium-ion secondary battery and its preparation method. The lithium-ion secondary battery prepared by the method of the present invention can form a conductive network inside the entire battery, so that it can give full play to the role of the active material. The internal resistance of the lithium-ion secondary battery can be extremely reduced, thereby improving the conductivity and rate capability, and the potential safety hazards caused by liquid electrolytes are also solved. And it exhibits high strain ability, good restorability and is easy to be carried. In addition, by controlling the type and content of each component in the gelable system for preparing the solid electrolyte, the strength, the formation time (i.e., transition from a free-flowing liquid state to a non-flowable solid electrolyte state), and the transition temperature (i.e., the lowest temperature when the non-flowable electrolyte state changes to a free-flowing liquid state) are adjustable, that is, the solid electrolytes of different strengths can be prepared to meet different needs according to specific requirements. The solid electrolyte also has good reversibility that, when the temperature is higher than the transition temperature of the solid electrolyte, the solid electrolyte becomes high flowing state, and when the temperature is lower than the transition temperature, the solid electrolyte is reformed without affecting its properties. Based on the above ideas, the present invention has been fully worked out.

The objects of the present invention can be realized by the following technical solutions:

A first object of the present invention provides a preparation method of a flexible all-solid-state lithium-ion secondary battery, comprising the following steps of:

1a) preparing a gelable system;

2a) assembling negative electrodes, separator, and positive electrodes to obtain an all-solid-state battery before injection;

3a) injecting the gelable system of step 1a) into the all-solid-state battery before injection of step 2a), sealing, and standing still to obtain an all-solid-state lithium-ion secondary battery;

wherein, the gelable system comprises the following components: lithium salts and ether compounds, and the ether compounds are selected from at least one of cyclic ether compounds or straight-chain ether compounds; the mass fraction of the gelable polymer and/or the gelable prepolymer in the system is less than or equal to 1 wt %.

According to the present invention, in the step 2a), the all-solid-state battery before injection refers to the battery with an injection port, i.e., a dry cell; the assembly methods are conventionally chosen by those skilled in the art, by any one of which the all-solid-state battery before injection can be prepared; for example, positive electrode, separator and negative electrode are assembled into the all-solid-state battery before injection by a method such as laminating or winding, etc.; or, negative electrode, separator and positive electrode are pressed into one piece in a battery pressing mold to form the all-solid-state battery before injection.

A second object of the present invention provides a preparation method of a flexible all-solid-state lithium-ion secondary battery, comprising the following steps of:

1b) preparing a gelable system;

2b) compressing anode material onto a negative electrode current collector to form negative electrode and then infiltrating into the gelable system of step 1b); or coating the gelable system of step 1b) on the surface of a negative electrode formed by compressing anode material onto a negative electrode current collector;

3b) compressing cathode material onto a positive electrode current collector to form positive electrode and then infiltrating into the gelable system of step 1b); or coating the gelable system of step 1b) on the surface of a positive electrode formed by compressing cathode material onto a positive electrode current collector;

4) choosing one of the following steps of:

4b) assembling the infiltrated or coated negative electrode of step 2b), separator, and the infiltrated or coated positive electrode of the step 3b) to obtain an all-solid-state lithium-ion secondary battery before injection; injecting the gelable system of step 1b) into the all-solid-state lithium-ion secondary battery before injection, sealing, and standing still to obtain an all-solid-state lithium-ion secondary battery; or 4b') coating the gelable system of step 1b) on the surface of a substrate, and solidifying the gelable system on the surface of the substrate to form a thin solid electrolyte membrane; assembling the infiltrated or coated negative electrode of step 2b), the thin solid electrolyte membrane, and the infiltrated or coated positive electrode of step 3b) to obtain an all-solid-state lithium-ion secondary battery; or 4b") coating the gelable system of step 1b) on the surface of a substrate, and solidifying the gelable system on the surface of the substrate to form a thin solid electrolyte membrane; assembling the infiltrated or coated negative electrode of step 2b), the thin solid electrolyte membrane, and the infiltrated or coated positive electrode of step 3b) to obtain an all-solid-state lithium-ion secondary battery before injection; injecting the gelable system of step 1b) into the all-solid-state lithium-ion secondary battery before injection, sealing, and standing still to obtain an all-solid-state lithium-ion secondary battery;

wherein, the gelable system comprises the following components: lithium salts and ether compounds, and the ether compounds are selected from at least one of cyclic ether compounds or straight-chain ether compounds; the mass fraction of the gelable polymer and/or the gelable prepolymer in the system is less than or equal to 1 wt %.

According to the present invention, in the step 4b), the assembly methods are conventionally chosen by those skilled in the art, by any one of which the all-solid-state lithium-ion secondary battery before injection can be prepared; for example, the infiltrated or coated negative electrode of step 2b), separator and the infiltrated or coated positive electrode of step 3b) are assembled into a battery by a method such as laminating or winding, etc.; or, the infiltrated or coated negative electrode of step 2b), a separator and the infiltrated or coated positive electrode of step 3b) are pressed into one piece in a battery pressing mold to form the all-solid-state lithium-ion secondary battery before injection. According to the present invention, in the step 4b'), the assembly methods are conventionally chosen by those skilled in the art, by any one of which the all-solid-state lithium-ion secondary battery can be prepared; for example, the infiltrated or coated negative electrode of step 2b), the thin solid electrolyte membrane and the infiltrated or coated positive electrode of step 3b) are assembled into a battery by a method such as laminating or winding, etc.; or, the infiltrated or coated negative electrode of step 2b), the thin solid electrolyte membrane and the infiltrated or coated positive electrode of step 3b) are pressed into one piece in a battery pressing mold to form the all-solid-state lithium-ion secondary battery.

According to the present invention, in the step 4b"), the assembly methods are conventionally chosen by those skilled in the art, by any one of which the all-solid-state lithium-ion secondary battery before injection can be prepared; for example, the infiltrated or coated negative electrode of step 2b), the thin solid electrolyte membrane and the infiltrated or coated positive electrode of step 3b) are assembled into a battery by a method such as laminating or winding, etc.; or, the infiltrated or coated negative electrode of step 2b), the thin solid electrolyte membrane and the infiltrated or coated positive electrode of step 3b) are pressed into one piece in a battery pressing mold to form the all-solid-state lithium-ion secondary battery before injection.

A third object of the present invention provides a preparation method of a flexible all-solid-state lithium-ion secondary battery, comprising the following steps of:

1c) preparing a gelable system;

2c) mixing and beating cathode material, conductive agent, the gelable system of step 1c) and optionally a binder with a solvent, and coating on the surface of a positive electrode current collector to obtain a positive electrode containing the gelable system;

3c) mixing and beating anode material, conductive agent, the gelable system of step 1c) and optionally a binder with a solvent, and coating on the surface of a negative electrode current collector to obtain a negative electrode containing the gelable system;

4) choosing one of the following steps of:

4c) coating the gelable system of step 1c) on the surface of a substrate, and solidifying the gelable system on the surface of a substrate to form a thin solid electrolyte membrane; assembling the positive electrode containing the gelable system of step 2c), the thin solid electrolyte membrane, the negative electrode containing the gelable system of step 3c) to obtain an all-solid-state lithium-ion secondary battery; or 4c') coating the gelable system of step 1c) on the surface of a substrate, and solidifying the gelable system on the surface of a substrate to form a thin solid electrolyte membrane; assembling the positive electrode containing the gelable system of step 2c), the thin solid electrolyte membrane, the negative electrode containing the gelable system of step 3c) to obtain an all-solid-state lithium-ion secondary battery before injection; injecting the gelable system of step 1c) into the all-solid-state lithium-ion secondary battery before injection, sealing, and standing still to obtain an all-solid-state lithium-ion secondary battery; or, 4c") assembling the positive electrode containing the gelable system of step 2c), separator, the negative electrode containing the gelable system of step 3c) to obtain an all-solid-state lithium-ion secondary battery before injection; injecting the gelable system of step 1c) into the all-solid-state lithium-ion secondary battery before injection, sealing, and standing still to obtain an all-solid-state lithium-ion secondary battery;

wherein, the gelable system comprises the following components: lithium salts and ether compounds, and the ether compounds are selected from at least one of cyclic ether compounds or straight-chain ether compounds; the mass fraction of the gelable polymer and/or the gelable prepolymer in the system is less than or equal to 1 wt %.

According to the present invention, in the step 4c), the assembly methods are conventionally chosen by those skilled in the art, by any one of which the all-solid-state lithium-ion secondary battery can be prepared; for example, the positive electrode containing the gelable system of step 2c), the thin solid electrolyte membrane and the negative electrode containing the gelable system of step 3c) are assembled into a battery by a method such as laminating or winding, etc.; or, the positive electrode containing the gelable system of step 2c), the thin solid electrolyte membrane and the negative electrode containing the gelable system of step 3c) are pressed into one piece in a battery pressing mold to form the all-solid-state lithium-ion secondary battery.

According to the present invention, in the step 4c'), the assembly methods are conventionally chosen by those skilled in the art, by any one of which the all-solid-state lithium-ion secondary battery before injection can be prepared; for example, the positive electrode containing the gelable system of step 2c), the thin solid electrolyte membrane and the negative electrode containing the gelable system of step 3c) are assembled into the all-solid-state lithium-ion secondary battery by a method such as laminating or winding, etc.; or, the positive electrode containing the gelable system of step 2c), the thin solid electrolyte membrane and the negative electrode containing the gelable system of step 3c) are pressed into one piece in a battery pressing mold to form the all-solid-state lithium-ion secondary battery.

According to the present invention, in the step 4c"), the assembly methods are conventionally chosen by those skilled in the art, by any one of which the all-solid-state lithium-ion secondary battery before injection can be prepared; for example, the positive electrode containing the gelable system of step 2c), separator and the negative electrode containing the gelable system of step 3c) are assembled into the all-solid-state lithium-ion secondary battery by a method such as laminating or winding, etc.; or, the positive electrode containing the gelable system of step 2c), separator and the negative electrode containing the gelable system of step 3c) are pressed into one piece in a battery pressing mold to form the all-solid-state lithium-ion secondary battery.

According to the first to third aspects of the present invention, in the gelable system, at least one of inorganic nanoparticles, other solvents and/or electrolytes, additives such as polyesters or blends thereof and so on, can also be included.

According to the present invention, in the step 1a) to step 1c), the total percent by mass of each component in the gelable system is 100 wt %.

According to the present invention, the gel system can be prepared to obtain a solid electrolyte after gelation, in the gelable system, the mass fraction of the lithium salts is greater than or equal to 5 wt % and less than or equal to 60 wt %, that of the ether compounds is greater than or equal to 20 wt % and less than or equal to 60 wt %, that of the other electrolyte or its solvent is greater than or equal to 20 wt % and less than or equal to 75 wt %, that of the inorganic nanoparticles is greater than or equal to 0 wt % and less than or equal to 30 wt %, and that of the additives is greater than or equal to 0 wt % and less than or equal to 30 wt %.

Preferably, the gel system can be prepared to obtain a solid electrolyte after gelation, in the gelable system, the mass fraction of the lithium salts is greater than or equal to 10 wt % and less than or equal to 40 wt %, that of the ether compounds is greater than or equal to 20 wt % and less than or equal to 60 wt %, that of the other electrolyte or its solvent is greater than or equal to 20 wt % and less than or equal to 60 wt %, that of the inorganic nanoparticles is greater than 0 wt % and less than or equal to 20 wt %, and that of the additives is greater than 0 wt % and less than or equal to 20 wt %.

According to the present invention, the gel system can be prepared to obtain a solid electrolyte after gelation, in the gelable system, the mass fraction of the lithium salts is greater than or equal to 5 wt % and less than or equal to 60 wt %, that of the ether compounds is greater than 60 wt % and less than or equal to 90 wt %, that of the other electrolyte or its solvent is greater than or equal to 5 wt % and less than or equal to 30 wt %, that of the inorganic nanoparticles is greater than or equal to 0 wt % and less than or equal to 30 wt %, and that of the additives is greater than or equal to 0 wt % and less than or equal to 30 wt %.

Preferably, the gel system can be prepared to obtain a solid electrolyte after gelation, in the gelable system, the mass fraction of the lithium salts is greater than or equal to 10 wt % and less than or equal to 40 wt %, that of the ether compounds is greater than 60 wt % and less than or equal to 85 wt %, that of the other electrolyte or its solvent is greater than or equal to 5 wt % and less than or equal to 30 wt %, that of the inorganic nanoparticles is greater than 0 wt % and less than or equal to 20 wt %, and that of the additives is greater than 0 wt % and less than or equal to 20 wt %.

According to the first to third aspects of the present invention, the preparation method of the gelable system specifically comprises the following steps of:

mixing ether compounds, lithium salts, optionally other solvents and/or electrolytes, optionally inorganic nanoparticles, and optionally additives to obtain a mixed solution under stirring, i.e., the gelable system.

Preferably, the preparation method of the gelable system specifically comprises the following steps of: adding ether compounds to lithium salts, obtaining a lithium salt solution of ether compounds under stirring, and optionally adding other solvents and/or electrolytes and/or inorganic nanoparticles and/or additives to the lithium salt solution of ether compounds, i.e., the gelable system.

According to the present invention, the ether compounds, the lithium salts, optionally the inorganic nanoparticles, optionally the other solvents and/or the electrolytes, and optionally the additives are pretreated to remove water; preferably, the ether compounds, the lithium salts, optionally the inorganic nanoparticles, optionally the other solvents and/or the electrolytes, and optionally the additives are pretreated to remove water by using molecular sieves and/or vacuum drying.

According to the first to third aspects of the present invention, the pressing process of the positive electrode or the negative electrode as one piece is performed under dry conditions.

According to the first to third aspects of the present invention, the coating is at least one selected from spraying, blade coating, roll coating, brush coating, etc.

According to the second aspect of the present invention, the infiltration time and the infiltration temperature are not limited; when the infiltration temperature is lower than the transition temperature of the solid electrolyte formed from the gelable system, the infiltration time is preferably less than the formation time which it takes for the gelable system to form the solid electrolyte; or, when the infiltration temperature is higher than the transition temperature of the solid electrolyte formed from the gelable system, a person skilled in the art can understand that the gelable system cannot form a gel, therefore the infiltration time is not limited.

According to the present invention, the selection of the conductive agents, the binders, the negative electrode current collectors, the anode materials, the separator, the positive electrode materials, and the positive electrode current collectors is not limited, and a person skilled in the art can understand that it can be used when it is suitable for the flexible all-solid-state lithium-ion secondary battery of the present invention.

Preferably, the conductive agent is at least one selected from conductive graphite, acetylene black, Super P® conductive carbon black, carbon nanotubes, graphene, graphene oxide, conductive carbon black, KETJENBLACK® carbon black, graphite (KS, SO), and SFG-6.

Preferably, the binder is at least one selected from polyvinylidene fluoride (PVDF), acrylate and its derivatives, cyclodextrin and its derivatives, calixarene and its derivatives, carboxymethyl cellulose and its derivatives, acrylic acid and its derivatives, amino resin and its derivatives, polyimide, organofluoropolymer, and organopolysiloxane.

Preferably, the negative electrode current collector is at least one selected from copper foil, copper alloys, silver foil, stainless steel sheet, and carbon material.

Preferably, the anode material is at least one selected from metallic anode materials (such as metal lithium, lithium alloys, etc.) and inorganic non-metallic anode materials (such as carbon materials, silicon materials, and other different non-metallic composite materials, etc.).

Preferably, the separator is selected from the solid electrolyte separator prepared from the gelable system of the present invention, or polyolefin porous membrane, such as at least one of polyethylene microporous membrane, polypropylene microporous membrane, and three-layers composite separator.

Preferably, the cathode material is at least one selected from lithium cobalt oxide, lithium nickel oxide, lithium manganese oxide, ternary material nickel-cobalt-manganese oxide, nano positive electrode materials (e.g., nanocrystalline spinel $LiMn_2O_4$, barium magnesium manganese ore-type $MnO_2$ nanofibers, polypyrrole-coated spinel-type $LiMn_2O_4$ nanotubes, polypyrrole/$V_2O_5$ nanocomposites, etc.), blended electrodes, vanadium oxide, and layered compounds (such as iron oxychloride modified by aniline, etc.).

Preferably, the positive electrode current collector is at least one selected from aluminum foil and aluminum alloys.

According to the present invention, in the above step, the standing still time is the formation time which it takes for the gelable system to convert into a solid electrolyte, and the standing still temperature is room temperature.

A fourth aspect of the present invention provides a flexible all-solid-state lithium-ion secondary battery, which is prepared by any one of the above methods.

According to the present invention, the lithium-ion secondary battery includes a lithium-ion battery, a lithium-sulfur battery, a lithium-air battery, and so on.

In the solid-state lithium-ion secondary battery currently used, a solid electrolyte is often used instead of a conventional liquid electrolyte, and even to replace the separator. However, in the solid-state lithium-ion secondary battery thus prepared, since the solid electrolyte can only contact with the surface of the electrodes, a conductive network can only be formed on the surface of the electrodes, and cannot be formed inside the electrodes, and moreover, large interfacial resistance is formed in the interior without contacting with the electrodes, and the active material inside the positive and negative electrodes cannot be fully utilized, which severely limit the electrochemical performance, cycle stability and cycle life of the lithium-ion secondary battery.

The present invention uses a gelable system as a solid electrolyte for the lithium-ion secondary battery. Before the gelable system forms the solid electrolyte, by a method of replacing the original binders in the positive and negative electrodes, or by a method of placing the positive and negative electrodes of the lithium-ion secondary battery in a gelable system in which a solid electrolyte has not yet formed by the way of infiltration or coating, or by a method of directly adding the gelable system to the lithium-ion secondary battery, the surfaces and the interiors of the positive and negative electrodes are infiltrated by the gelable system, which also fills the voids inside the positive and negative electrodes. After the gelable system is solidified, it can form the solid electrolyte in-situ on the surfaces and interiors of the positive and negative electrodes.

In the present invention, the "all-solid-state" includes an all-solid state, i.e., the electrolyte system does not contain any flowable liquid; and also includes a semi-solid state, i.e., a certain liquid component is contained in the electrolyte system, but the obtained electrolyte is almost non-flowable.

Advantageous Effects of the Present Invention

The present invention provides a flexible all-solid-state lithium-ion secondary battery and its preparation method, which is prepared by a method of replacing the original binders in the positive and negative electrodes, or by a method of placing the positive and negative electrodes of the lithium-ion secondary battery in a gelable system in which a solid electrolyte has not yet formed by the way of infiltration or coating, or by a method of directly adding the gelable system to the lithium-ion secondary battery, so that the surfaces and the interiors of the positive and negative electrodes are infiltrated by the gelable system, which also fills the voids inside the positive and negative electrodes. After the gelable system is solidified to form the solid electrolyte, it can form the solid electrolyte in-situ on the surfaces and interiors of the positive and negative electrodes. The all-solid-state lithium-ion secondary battery prepared by the above methods can form a conductive network inside the entire battery, which can not only extremely reduce the internal resistance of the lithium-ion secondary battery, thereby improving the conductivity and rate capability, but also solve the potential safety hazard problem caused by liquid electrolytes.

DETAILED DESCRIPTION OF THE INVENTION

Lithium Salts

Figure 1:
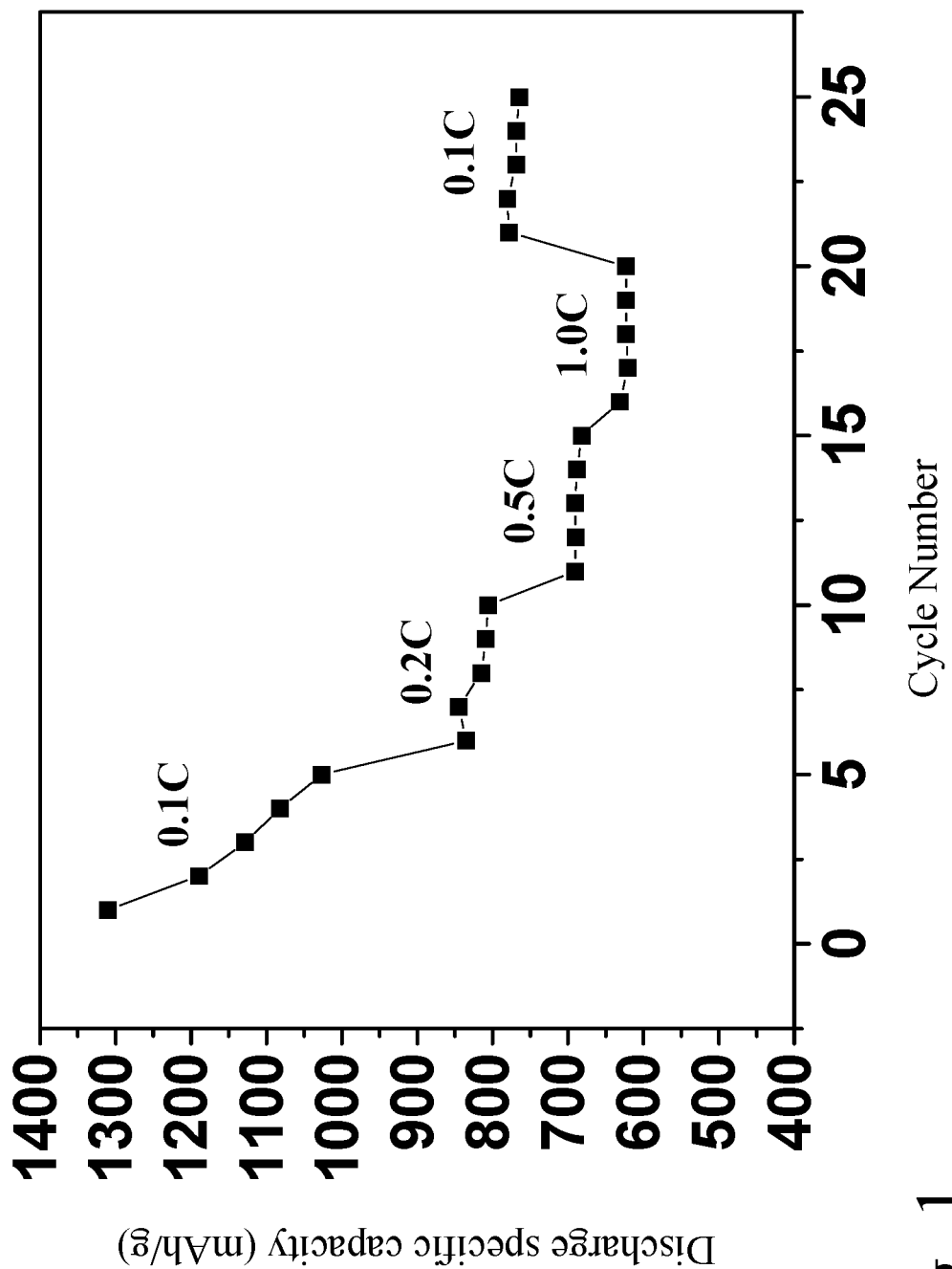
FIG. 1 is a graph showing the rate capability of the battery obtained by the assembly method in Example 2.

The gelable system of the present invention contains lithium salts, the lithium salts are one or more selected from the group consisting of lithium hexafluorophosphate, lithium tetrafluoroborate, lithium hexafluoroarsenate, lithium perchlorate, lithium trifluoromethanesulfonate, lithium perfluorobutanesulfonate, lithium bis(trifluoromethanesulfonyl)imide, lithium bis(fluorosulfonyl)imide, lithium aluminate, lithium chloroaluminate, lithium fluorosulfonyl imide, lithium chloride and lithium iodide;

Preferably, the lithium salts are selected from one or both of lithium hexafluorophosphate, lithium perchlorate, etc.

[Ether Compounds]

The gelable system of the present invention contains ether compounds, which is selected from at least one of cyclic ether compounds or straight-chain ether compounds.

[Cyclic Ether Compounds]

The ether compound of the present invention may be selected from cyclic ether compounds, which are selected from cyclic ether compounds containing one oxygen atom, two oxygen atoms, three oxygen or more atoms.

In the present invention, the cyclic ether compounds are selected from $C_2$ to $C_{20}$ cycloalkanes having at least one oxygen atom (i.e., 2 to 20 carbon atoms in a ring structure), or $C_3$ to $C_{20}$ cycloalkenes having at least one oxygen atom (i.e., 3 to 20 carbon atoms in a ring structure), which contain at least one carbon-carbon double bond.

In the present invention, the cycloalkanes or cycloalkenes are monocyclic rings, fused rings (such as bicyclic rings), spiro rings or bridged rings; when the cycloalkanes or cycloalkenes are spiro rings or bridged rings and contain two or more oxygen atoms, the oxygen atoms can be in one ring or in multiple rings.

In the present invention, the cyclic ether compounds are selected from $C_2$ to $C_{20}$ monocycloalkanes having at least one oxygen atom, preferably $C_3$ to $C_{20}$ monocycloalkenes having at least one oxygen atom, for example, one of the following first class compounds:

In the present invention, the cyclic ether compounds are selected from $C_4$ to $C_{20}$ fused cycloalkanes having at least one oxygen atom, for example, one of the following second class compounds:

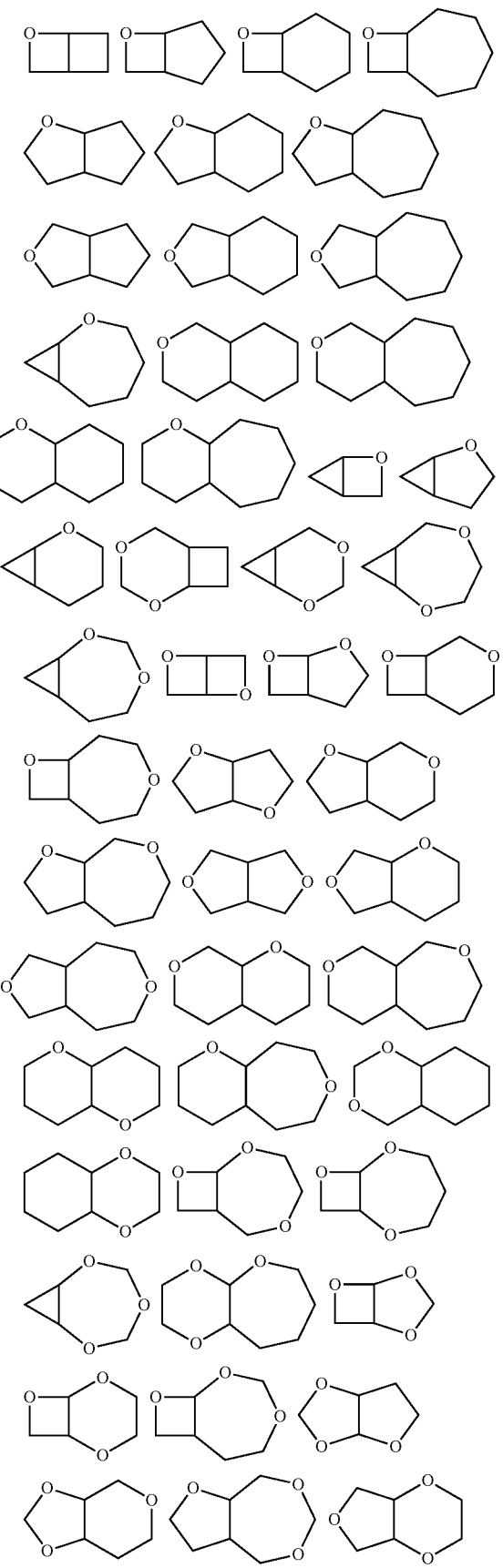

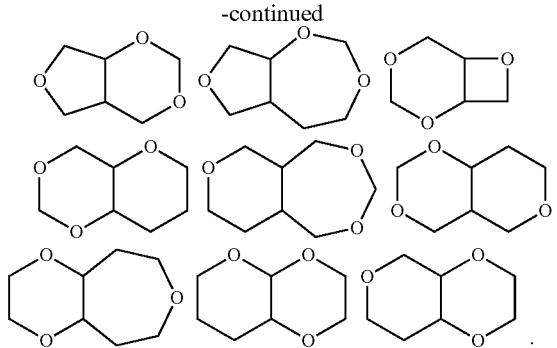

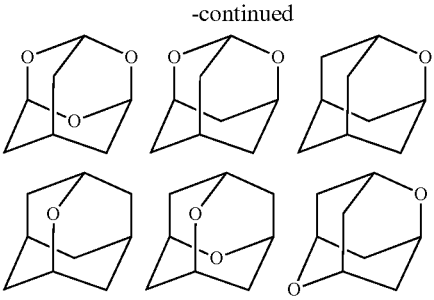

In the present invention, the cyclic ether compounds are selected from C₄ to C₂₀ bridged cycloalkanes having at least one oxygen atom, for example, one of the following third class compounds:

In the present invention, the cyclic ether compounds are selected from C₄ to C₂₀ spiro cycloalkanes having at least one oxygen atom, for example, one of the following fourth class compounds:

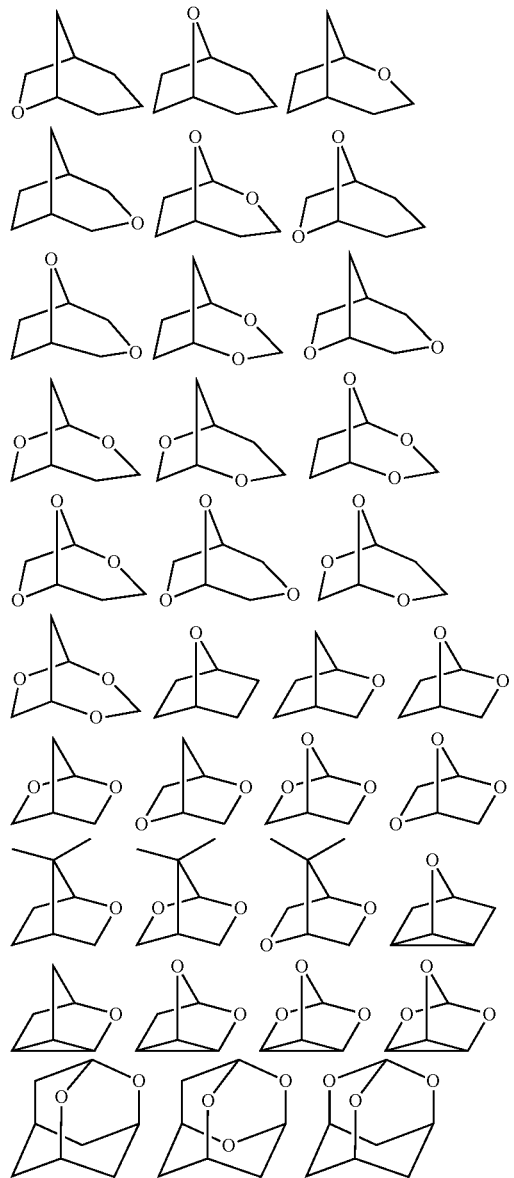

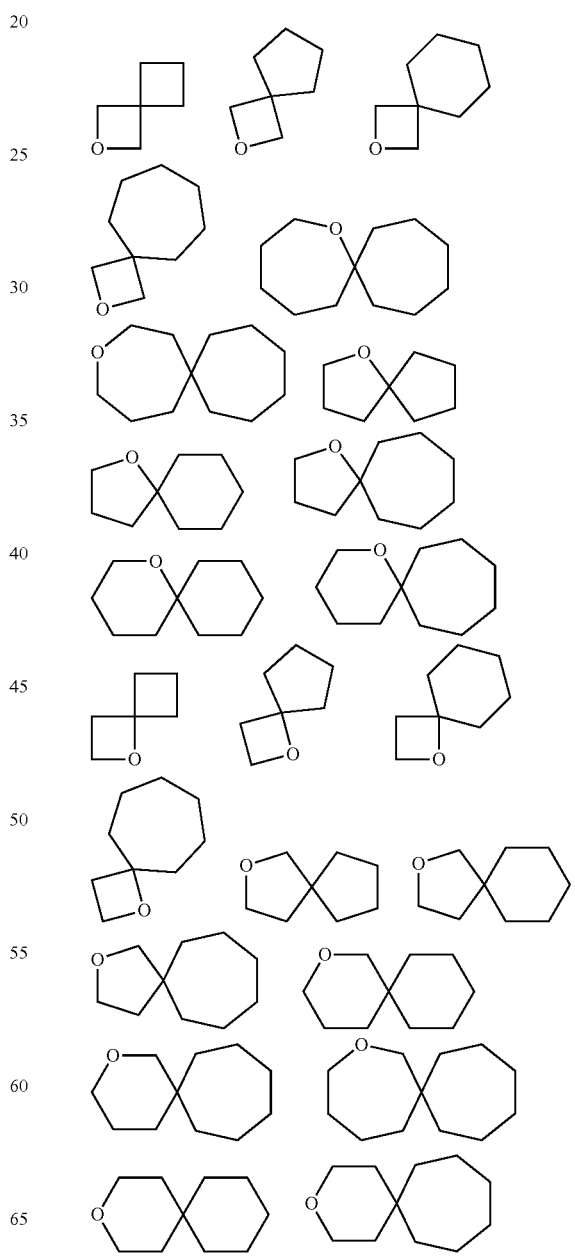

-continued

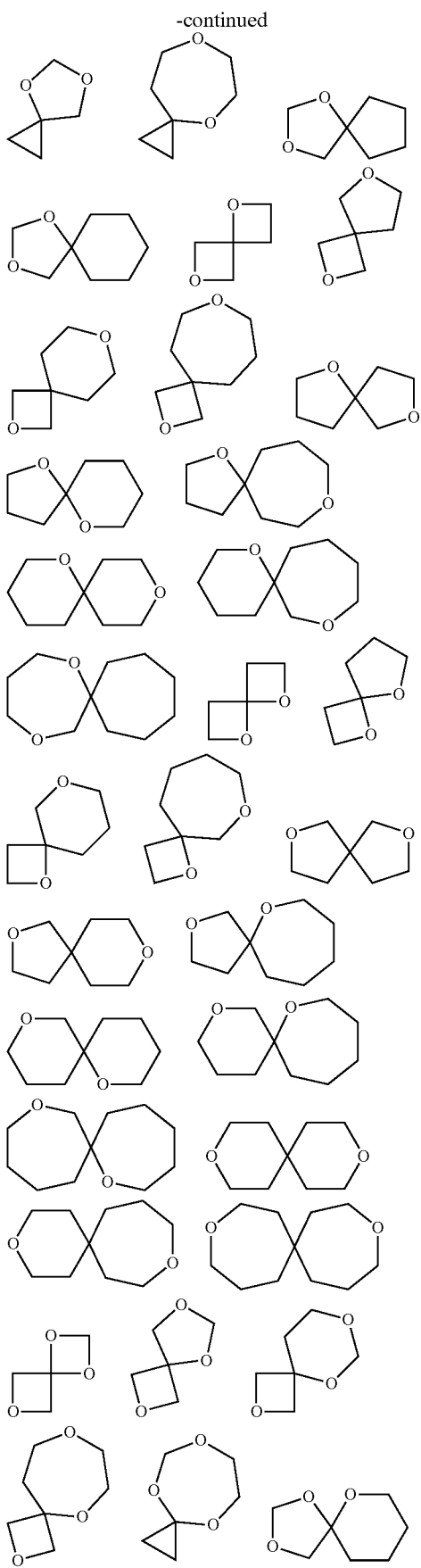

-continued

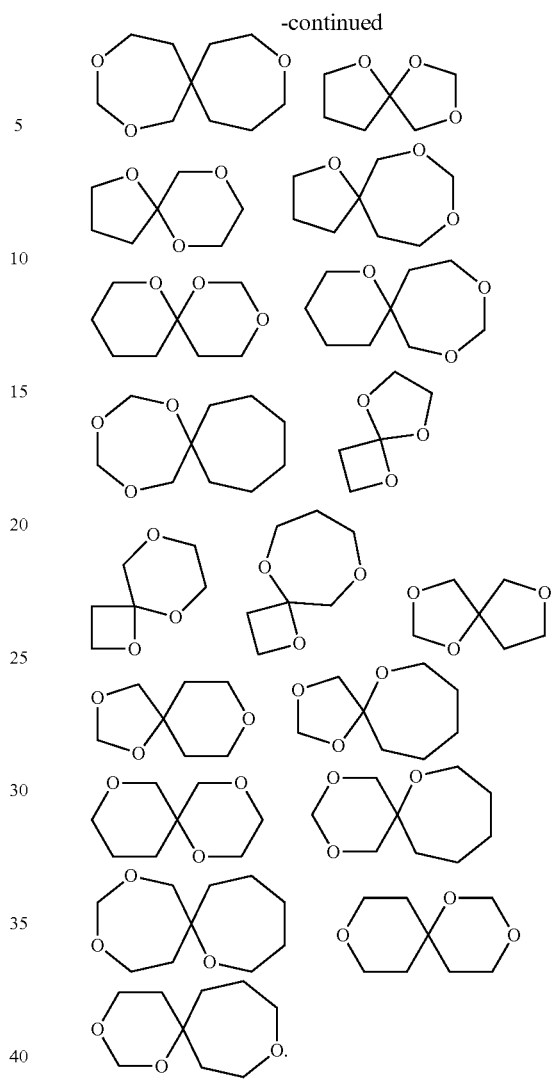

In the present invention, the stable compounds, which have at least one C—C bond in the ring structures in the above four classes of compounds replaced by the C=C bond, are the above $C_3$ to $C_{20}$ cycloalkenes having at least one oxygen atom, which are one of the preferred cyclic ether compounds of the present invention.

In the present invention, when the cycloalkanes or cycloalkenes are monocyclic or fused rings, the carbon atoms in the rings may be substituted by one or more R1 groups; when the cycloalkanes or cycloalkenes are bridged rings, the carbon atoms not on the bridge may be substituted by one or more R1 groups; when the cycloalkanes or cycloalkenes are spiro rings, the carbon atoms in the rings may be substituted by one or more R1 groups. The R1 group is selected from the group consisting of alkyl, alkenyl, alkynyl, alkoxy, alkylthio, haloalkyl, cycloalkyl, cycloalkyloxy, cycloalkylsulfide, heterocyclyl, heterocyclyloxy, heterocyclylthio, aryl, aryloxy, heteroaryl, heteroaryloxy, hydroxy, thiol, nitro, carboxyl, amino, ester, halogen, acyl, aldehyde.

In the present invention, the cyclic ether compounds containing an oxygen atom are selected from substituted or unsubstituted oxetane, substituted or unsubstituted tetrahydrofuran, substituted or unsubstituted tetrahydropyran; the number of the substituents may be one or more; the substituent is the above R1 group.

In the present invention, the cyclic ether compounds containing an oxygen atom are selected from the group consisting of 3,3-dichloromethyloxetane, 2-chloromethyloxetane, 2-chloromethylpropylene oxide, 1,4-epoxycyclohexane, 1,3-epoxycyclohexane, tetrahydrofuran, 2-methyltetrahydrofuran, 3-methyltetrahydrofuran, tetrahydropyran, 2-methyltetrahydropyran, oxacycloheptane, oxacyclooctane, oxonane and oxacyclodecane.

In the present invention, the cyclic ether compounds containing two oxygen atoms are selected from substituted or unsubstituted 1,3-dioxolane (DOL), substituted or unsubstituted 1,4-dioxane; the number of the substituents may be one or more; the substituent is the above R1 group.

In the present invention, the cyclic ether compounds containing three oxygen atoms are selected from substituted or unsubstituted trioxymethylene; the number of the substituents may be one or more; and the substituent is the above R1 group.

In the present invention, the ether compounds containing more oxygen atoms are selected from the group consisting of substituted or unsubstituted 18-crown-6, substituted or unsubstituted 12-crown-4, substituted or unsubstituted 24-crown-8; the number of the substituents may be one or more; the substituent is the above R1 group.

[Straight-Chain Ether Compounds]

In the present invention, the general formula of the straight-chain ether compounds is as shown in Formula (1):

R$_1$—O—(R$_2$—O)$_n$—R$_3$    Formula (1)

wherein, n is an integer greater than 0;

R$_2$ is selected from a straight-chain or branched C$_1$-C$_6$ alkylene group, a straight-chain or branched C$_2$-C$_6$ alkenylene group; and H on the carbon atom of R$_2$ may be substituted by at least one of the following groups: alkenyl, alkynyl, alkoxy, alkylthio, cycloalkyl, cycloalkyloxy, cycloalkylthio, heterocyclyl, heterocyclyloxy, heterocyclylthio, aryl, aryloxy, heteroaryl, heteroaryloxy, hydroxy, thiol, nitro, carboxy, amino, ester, halogen, acyl, aldehyde;

R$_1$ and R$_3$ are the same or different, and each of R$_1$ and R$_3$, independently, is selected from one or more of a hydrogen atom, an alkyl group, a cycloalkyl group, a heterocyclyl group, an alkenyl group, an alkynyl group; and H on the carbon atom of R$_1$ and R$_3$ may be substituted by at least one of the following groups: alkenyl, alkynyl, alkoxy, alkylthio, cycloalkyl, cycloalkyloxy, cycloalkylthio, heterocyclyl, heterocyclyloxy, heterocyclylthio, aryl, aryloxy, hydroxy, thiol, nitro, carboxy, amino, ester, halogen, acyl, aldehyde.

Preferably, n is an integer between 1 and 6;

R$_2$ is selected from a straight-chain or branched C$_1$-C$_4$ alkylene group, a straight-chain or branched C$_2$-C$_6$ alkenylene group;

R$_1$ and R$_3$ are the same or different, and each of R$_1$ and R$_3$, independently, is selected from a straight-chain or branched C$_1$-C$_6$ alkyl group.

More preferably, R$_2$ is selected from the group consisting of methyl, ethyl, propyl, isopropyl, butyl, isobutyl, and vinyl;

R$_1$ and R$_3$ are the same or different, and each of R$_1$ and R$_3$, independently, is selected from the group consisting of methyl, ethyl, and propyl.

Still preferably, the straight-chain ether compounds are selected from one or more groups consisting of ethylene glycol dimethyl ether, ethylene glycol diethyl ether, ethylene glycol methyl ethyl ether, 1,4-butanediol dimethyl ether, 1,4-butanediol diethyl ether, 1,4-butanediol methyl ethyl ether, etc. In the present invention, the straight-chain ether compounds are, for example, one of the following compounds:

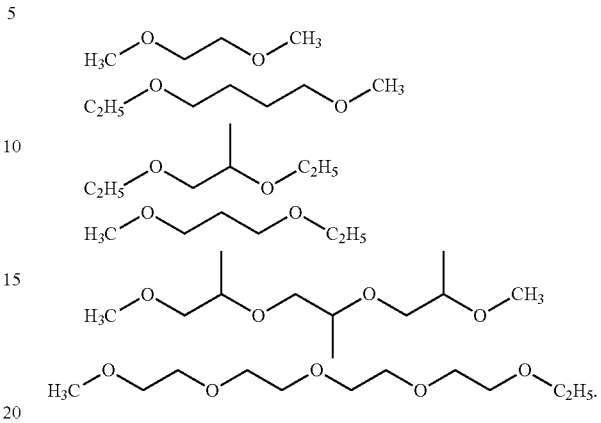

[Gelable System]

In the present invention, the gelable system contains lithium salts and ether compounds, and the ether compounds are selected from cyclic ether compounds.

In the present invention, the gelable system contains lithium salts, ether compounds and the other solvents and/or electrolytes, and the ether compounds are selected from cyclic ether compounds.

In the present invention, the gelable system contains lithium salts, ether compounds and inorganic nanoparticles, and the ether compounds are selected from cyclic ether compounds.

In the present invention, the gelable system contains lithium salts, ether compounds, the other solvents and/or electrolytes, and inorganic nanoparticles, and the ether compounds are selected from cyclic ether compounds.

In the present invention, the gelable system contains lithium salts, ether compounds and additives, and the ether compounds are selected from cyclic ether compounds.

In the present invention, the gelable system contains lithium salts and ether compounds, and the ether compounds are selected from straight-chain ether compounds.

In the present invention, the gelable system contains lithium salts, ether compounds and the other solvents and/or electrolytes, and the ether compounds are selected from straight-chain ether compounds.

In the present invention, the gelable system contains lithium salts, ether compounds and inorganic nanoparticles, and the ether compounds are selected from straight-chain ether compounds.

In the present invention, the gelable system contains lithium salts, ether compounds, the other solvents and/or electrolytes, and inorganic nanoparticles, and the ether compounds are selected from straight-chain ether compounds.

[Inorganic Nanoparticles]

In the present invention, the inorganic nanoparticles are one or more selected from the group consisting of silica, alumina, silicon nitride, zinc oxide, titanium dioxide, silicon carbide, silicate, calcium carbonate, barium sulfate, clay, ferroferric oxide, cerium oxide, nano carbon materials, and ferric oxide, etc.; preferably, the inorganic nanoparticles are one or more selected from the group consisting of silica, alumina, titanium dioxide, and zinc oxide.

[Other Solvents and/or Electrolytes]

In the present invention, the gelable system also comprises other solvents and/or electrolytes, which include at least one of electrolytes used in lithium-sulfur batteries, solvents for the electrolytes used in lithium-sulfur batteries, electrolytes used in lithium-ion batteries, solvents for the electrolytes used in lithium-ion batteries, and electrolytes or solvents thereof used in lithium-air batteries.

In the present invention, the electrolytes or solvents thereof used in lithium-air batteries include ether electrolytes and solvents thereof, ester electrolytes and solvents thereof, amide electrolytes and solvents thereof, nitrile electrolytes and solvents thereof, or sulfone electrolytes and solvents thereof. In the present invention, the electrolytes used in lithium-ion batteries are selected from a ester mixture solution containing lithium salts used in lithium-ion batteries, for example, a mixture solution of ethylene carbonate (EC) and dimethyl carbonate (DMC) containing 1 M lithium hexafluorophosphate (LiPF$_6$), wherein the volume ratio of the ethylene carbonate (EC) to the dimethyl carbonate (DMC) is 1:1.

In the present invention, the solvents for the electrolytes used in lithium-ion batteries is at least one selected from the group consisting of cyclic non-aqueous organic solvents for electrolytes used in lithium-ion batteries and chain non-aqueous organic solvents for electrolytes used in lithium-ion batteries.

In the present invention, the cyclic non-aqueous organic solvents for electrolytes used in lithium-ion batteries are at least one selected from the group consisting of ethylene carbonate (EC), propylene carbonate (PC), fluoroethylene carbonate (FEC), γ-butyrolactone (GBL), ethylene sulfite (ES), propylene sulfite (PS), sulfolane (SL), and glycerol carbonate (GC).

In the present invention, the chain non-aqueous organic solvents for electrolytes used in lithium-ion batteries are at least one selected from the group consisting of diethyl carbonate (DEC), dimethyl carbonate (DMC), ethylmethyl carbonate (EMC), methylpropyl carbonate (MPC), dipropyl carbonate (DPC), ethylpropyl carbonate (EPC), ethyl acetate (EA), propyl acetate (PA), ethyl propionate (EP), ethyl butyrate (EB), methyl butyrate (MB), dimethyl sulfite (DMS), diethyl sulfite (DES), ethylmethyl sulfite (EMS), dimethyl sulfone (MSM), and dimethyl sulfoxide (DMSO).

In the present invention, the electrolytes used in the lithium-sulfur batteries are selected from a ether mixture solution containing lithium salts, for example, a mixture solution of 1,3-dioxolane (DOL) and ethylene glycol dimethyl ether (DME) containing 1 M lithium bis(trifluoromethanesulfonyl)imide (LiTFSI), wherein the volume ratio of the 1,3-dioxolane (DOL) to the ethylene glycol dimethyl ether (DME) is 1:1.

In the present invention, the solvents for the electrolytes used in lithium-sulfur batteries is one or more selected from the group consisting of 1,3-dioxolane, 1,2-dimethoxyethane, triethylene glycol dimethyl ether, tetraethylene glycol dimethyl ether, fluoroethylene carbonate, polyethylene glycol borate, and 1,1',2,2'-tetrafluoroethyl-2,2',3,3'-tetrafluoropropylene ether.

In the present invention, the ester electrolytes are selected from an ester mixture solution containing lithium salts, for example, a mixture solution of ethylene carbonate (EC) and dimethyl carbonate (DMC) containing 1 M lithium hexafluorophosphate (LiPF$_6$), wherein the volume ratio of the ethylene carbonate (EC) to the dimethyl carbonate (DMC) is 1:1.

In the present invention, the solvents for the ester electrolytes is at least one selected from the group consisting of ester cyclic non-aqueous organic solvents and ester chain non-aqueous organic solvents.

In the present invention, the ester cyclic non-aqueous organic solvents are at least one selected from the group consisting of ethylene carbonate (EC), propylene carbonate (PC), fluoroethylene carbonate (FEC), γ-butyrolactone (GBL), ethylene sulfite (ES), propylene sulfite (PS), and glycerol carbonate (GC).

In the present invention, the chain non-aqueous organic solvents are at least one selected from the group consisting of diethyl carbonate (DEC), dimethyl carbonate (DMC), ethylmethyl carbonate (EMC), methylpropyl carbonate (MPC), dipropyl carbonate (DPC), ethylpropyl carbonate (EPC), ethyl acetate (EA), propyl acetate (PA), ethyl propionate (EP), ethyl butyrate (EB), methyl butyrate (MB), dimethyl sulfite (DMS), diethyl sulfite (DES), ethylmethyl sulfite (EMS).

In the present invention, the ether electrolytes are selected from a ether mixture solution containing lithium salts, for example, a mixture solution of 1,3-dioxolane (DOL) and ethylene glycol dimethyl ether (DME) containing 1 M lithium bis(trifluoromethanesulfonyl)imide (LiTFSI), wherein the volume ratio of the 1,3-dioxolane (DOL) to the ethylene glycol dimethyl ether (DME) is 1:1.

In the present invention, the solvents for the ether electrolytes is one or more selected from the group consisting of 1,3-dioxolane, 1,2-dimethoxyethane, triethylene glycol dimethyl ether, tetraethylene glycol dimethyl ether, fluoroethylene carbonate, polyethylene glycol borate, and 1,1',2,2'-tetrafluoroethyl-2,2',3,3'-tetrafluoropropylene ether.

In the present invention, the amide electrolytes are selected from amide mixed solutions containing lithium salts, for example, a solution of N,N-dimethylacetamide containing 1 M lithium trifluoromethanesulfonate.

In the present invention, the solvents for amide electrolyte are selected from compounds containing amide groups;

Preferably, the solvents for amide electrolyte are at least one selected from the group consisting of $C_1$-$C_{20}$ alkyl amides, $C_1$-$C_{20}$ enamide, $C_1$-$C_{20}$ alkynyl amides, $C_1$-$C_{20}$ haloalkyl amides, $C_1$-$C_{20}$ haloalkenyl amides, $C_1$-$C_{20}$ haloalkynyl amides, $C_7$-$C_{20}$ aryl amides, and $C_1$-$C_{20}$ epoxy amides. Preferably, the solvents for amide electrolyte are at least one selected from the group consisting of N,N-dimethylformamide, N,N-dimethylacetamide, benzamide, formamide, acetamide, succinimide, phthalic acid imide, N-methyl-p-toluenesulfonamide, N-methylacetamide, 3-amino-6-methylbenzenesulfonamide, 2,2,2-trichloroacetamide, benzyl ester N-ethyl-p-toluenesulfonamide, 3-amino-2,2-dimethylpropanamide, erucamide, N-ethyl-5-methyl-2-(1-methylethyl)cyclohexanecarboxamide, 4-methoxybenzamide, 2,4-dihydroxybenzamide, N,N-diethyl-2-chloroacetamide, N-butylbenzenesulfonamide, N-ethylacetamide, chloroacetamide, N-(2-chlorophenyl)acetamide hydrochloride, N,N'-ethylene bisstearamide, valeramide, 2-hydroxyisobutyramide, ethoxyamide, benzoyl ester cinnamamide, L-(+)-camphor sulfonamide, malonamide, sulfonamide, cyclopropane sulfonamide, 2-ethanesulfonyl imidazo[1,2-a]pyridine-3-sulfonamide, N,N-diethylacetamide, 4-chlorothiobenzamide, N,N'-dimethyloxamide, N-methoxy-N-methylacetamide, benzamide, N-methylcaprolactam, (S)-(−)-tert-butylsulfinamide, 3-amino-N-methylbenzamide, N,N'-methylenebisacrylamide, 2,2-dibromo-3-nitrilopropionamide, N,N-diethyldodecamide, hydrazine formimide amide, thioacetamide hydrochloride, cyanoacetamide, propionamide, benzamide, 2-nitrobenzenesulfonamide, p-aminobenzamide, isobutyramide, caprolactam, ortho-methyl formate benzenesulfonamide, N-methylformamide, N-tert-butylacrylamide, 6-methylnicotinamide, N,N-dimethylsulfonamide, 2,3-dibromopropionamide, 2-amino- 5-methylbenzoylamide, L-camphorsultam, DL-aminocaprolactam stearamide, 1,1-cyclohexanediacetic acid monoamide, cyclopropionamide, p-nitrobenzamide, 4-(2-aminoethyl)benzene sulfonamide, 2-methyl-5-nitrobenzenesulfonamide, 3,5-dihydroxybenzamide, 2-acrylamido-2-methylpropanesulfonic acid-N-methylsuccinic acid, N,2,3-trimethyl-2-isopropylbutanamide, N,N-dimethylpropionamide, N-vinylcaprolactam, 2-iodoacetamide, anthranilamide, 2,4-dichloro-5-sulfonamidobenzoic acid-N-phenylmaleimide, N-ethylmaleimide, 5-chloro-2,4-disulfonamidoaniline-o-chlorobenzenesulfonamide, N,N-dimethylglycinamide, 2-aminophenol-5-(N,N-dimethyl)sulfonamide, 4-amino-3,5-dinitrobenzamide, 4-amino-N-methylbenzamide, 2-phenylacetamide, N-(tert-butoxycarbonyl)-p-toluenesulfonamide, 4-fluorobenzamide, oxime 2-aminomalonamide, bis(tetramethylene)fluoroformamide, N-hydroxyisobutyramide, thiopropionamide, ethyl ester 1-((cyano-1-methylethyl)azo)carboxamide, cinnamamide, 4-aminophenyl-N-methylmethanesulfonamide, 4-bromo-3-fluorobenzenesulfonamide, 2,6-difluorobenzenesulfonamide, 2-bromobenzenesulfonamide, 4-fluorobenzenesulfonamide, 4-(trifluoromethoxy)benzenesulfonamide, 4-chlorobenzenesulfonamide, 2,5-difluorobenzenesulfonamide, trifluoromethanesulfonamide, N-[bis(methylthio)methylene]-p-toluenesulfonamide, 4-chloro-3-nitro-5-sulfonamidobenzoic acid, N-methyldiacetamide N-benzylidenebenzenesulfonamide, 2-methoxy-5-sulfonamide, 3,5-dichlorobenzenesulfonamide, 2-fluorobenzenesulfonamide, 4-bromo-2-chlorobenzenesulfonamide, 5-chloro-2-fluorobenzenesulfonamide, amino p-methoxybenzenesulfonamide, 4-chloro salicylic acid-5-sulfonamide, 2-amino-N-ethyl-N-phenylbenzenesulfonamide, 2-bromo-4-fluorobenzenesulfonamide, 4-fluoro-2-methylbenzenesulfonamide, 2-cyanobenzenesulfonamide, 4-[2-(5-chloro-2-methoxybenzamido)ethyl]benzenesulfonamide, 3,4-difluorobenzenesulfonamide, DL-aminocaprolactam, 2,4,6-trichlorobenzenesulfonamide, cyclopropanesulfonamide, 4-bromo-3-(trifluoromethyl)benzenesulfonamide, N-(4-aminobutyl)-acetamide ceramide, N-[(1R)-2-(3-aminosulfonyl-4-methoxy)-1-methyl]acetamide, N-benzyl-N-nitroso-p-toluenesulfonamide, N-(2-aminoethyl)-4-methylbenzenesulfonamide, (1R)-10-camphorsulfonamide, 4-amino-6-(trifluoromethyl)benzene-1,3-disulfonamide, 2-bromo-4-(trifluoromethyl)benzenesulfonamide, 3-fluoro-4-methyltoluenesulfonamide, 2-bromo-5-(trifluoromethyl)benzenesulfonamide, naphthalene-2-sulfonamide, (1S)-10-camphorsulfonamide, (S)-(+)-p-methylbenzenesulfinamide, (1R)-trans-N,N'-1,2-cyclohexanediyl bis (1,1,1-trifluoromethanesulfonamide), N-(2-fluorophenyl)methanesulfonamide, (S)—N-(−)-p-tolylsulfinyltryptamine, N-acetoxy-N-acetyl-4-chlorobenzenesulfonamide, 2-(trimethylsilyl)ethanesulfonamide, N-(4-aminophenyl)-sulfonamide-4-methylbenzene(R)-(−)-4-methylbenzenesulfinamide, N-ethyl-p-toluenesulfonamide, (R,R)-(+)-N,N'-bis(a-methylbenzyl)sulfamide, (S)-(−)-N-[1-(hydroxymethyl)-2-phenylethyl]-4-methylbenzenesulfonamide, cyclopropionamide, 2-chloro-4-fluoro-5-sulfamoylbenzoic acid N-benzylidene-P,P-diphenylphosphinic amide, and N-(4-chlorobenzylidene)-4-toluenesulfonamide.

In the present invention, the nitrile electrolytes are selected from nitrile mixed solution containing lithium salts, for example, an acetonitrile solution containing 1 M lithium perchlorate.

In the present invention, the solvents for nitrile electrolyte are selected from compounds containing nitrile groups; Preferably, the solvents for nitrile electrolyte are at least one selected from the group consisting of $C_1$-$C_{20}$ alkyl nitriles, $C_1$-$C_{20}$ alkenyl nitriles, $C_1$-$C_{20}$ alkynyl nitriles, $C_1$-$C_{20}$ haloalkyl nitriles, and $C_1$-$C_{20}$ haloalkenyl nitriles, $C_1$-$C_{20}$ haloalkynyl nitriles, $C_7$-$C_{20}$ aryl nitriles, and $C_1$-$C_{20}$ epoxy nitriles.

Preferably, the solvents for nitrile electrolyte are selected from acetonitrile, or butyronitrile.

In the present invention, the sulfone electrolytes are selected from sulfone mixed solutions containing lithium salts, for example, a dimethyl sulfoxide (DMSO) solution containing 1 M lithium perchlorate.

In the present invention, the solvents for sulfone electrolyte are selected from compounds containing sulfone groups;

Preferably, the solvents for sulfone electrolyte are at least one selected from the group consisting of $C_1$-$C_{20}$ alkyl sulfones, $C_1$-$C_{20}$ alkenyl sulfones, $C_1$-$C_{20}$ alkynyl sulfones, $C_1$-$C_{20}$ haloalkyl sulfones, and $C_1$-$C_{20}$ haloalkenyl sulfones, $C_1$-$C_{20}$ haloalkynyl sulfones, $C_7$-$C_{20}$ aryl sulfones, and $C_1$-$C_{20}$ epoxy sulfones.

Preferably, the solvents for sulfone electrolyte are selected from sulfolane (SL), or dimethyl sulfoxide.

[Additives]

In the present invention, the additives are one or more selected from polyesters or their blends; wherein, the polyesters are obtained by polycondensation of polybasic acids or acid anhydrides with polyhydric alcohols; the polybasic acids are selected from the group consisting of dibasic acids, tribasic acids or higher polybasic acids, and the polyhydric alcohols are selected from the group consisting of diols, triols or higher polyols.

In the present invention, the polybasic acids are selected from one or two or three or more than three of the following polybasic acids which are substituted or unsubstituted: oxalic acid, malonic acid, succinic acid, butenedioic acid, glutaric acid, adipic acid, pimelic acid, suberic acid, sebacic acid, azelaic acid, tricarballylic acid; the number of the substituents is one or multiple; when the substituents are multiple, they can form rings; the substituents are one or more selected from the group constituting of alkyl, cycloalkyl, aryl, hydroxy, amino, ester, halogen, acyl, aldehyde, thiol, and alkoxy, etc.

In the present invention, the acid anhydrides are selected from one or two or three or more than three of the following anhydrides which are substituted or unsubstituted: oxalic anhydride, malonic anhydride, succinic anhydride, maleic anhydride, glutaric anhydride, adipic anhydride, pimelic anhydride, suberic anhydride, sebacic anhydride, azelaic anhydride, hexahydrophthalic anhydride, tetrahydrophthalic anhydride; the number of the substituents is one or multiple; when the substituents are multiple, they can form rings; the substituents are one or more selected from the group constituting of alkyl, cycloalkyl, aryl, hydroxy, amino, ester, halogen, acyl, aldehyde, thiol, and alkoxy, etc.

In the present invention, the polyhydric alcohols are selected from one or more of the following polyhydric alcohols which are substituted or unsubstituted: propanediol, butanediol, pentanediol, hexanediol, heptanediol, octanediol, nonanediol, decanediol, polyethylene glycol, glycerol; the number of the substituents is one or multiple; when the substituents are multiple, they can form rings; the substituents are one or more selected from the group constituting of alkyl, cycloalkyl, aryl, hydroxy, amino, ester, halogen, acyl, aldehyde, thiol, alkoxy, etc.

In the present invention, the polyhydric alcohols are selected from polyethylene glycol, or a combination of polyethylene glycol and one or more of the following polyols: propanediol, butanediol, pentanediol, hexanediol, heptanediol, octanediol, nonanediol, decanediol.

In the present invention, the polymerization degree of the polyethylene glycol is from 100 to 1000, preferably from 150 to 800, still more preferably from 200 to 600. Wherein, the weight ratio of the polyethylene glycol to the other polyhydric alcohols is 1:(0 to 1), preferably 1:(0 to 0.9), and more preferably 1:(0 to 0.8).

Terms and Definitions

Unless otherwise specified, the definitions of groups and terms given in the specification of the present application, including their definitions as examples, exemplary definitions, preferred definitions, definitions listed in the tables, definitions of specific compounds in the examples, etc., can be combined and merged arbitrarily between each other. The definitions of groups and compound structures after such combinations and merges are intended to be within the scope of protection of the present application.

The term "gel" in the present invention has a meaning well known in the art, and the term "gelation" also has a meaning well known in the art.

The gelable polymers and/or gelable prepolymers in the present invention mean the polymers and/or prepolymers which can form gel or can be gelled under certain conditions.

Without limitation, the gelable polymers and/or gelable prepolymers of the present invention can be one or more selected from the group consisting of poly(ethylene oxide) (PEO), poly(ethylene glycol) (PEG), poly(vinylidene fluoride) (PVDF), polyvinyl chloride (PVC), polystyrene (PS), polyacrylonitrile (PAN), poly(vinyl acetate) (PVAC), polyvinylpyrrolidone (PVP), poly(divinyl sulfide) (PVS), poly (trimethylene carbonate) (PTMC), poly(methyl methacrylate) (PMMA), poly(ethylene glycol dimethacrylate) (PEGDM), polyoxypropylene (PPO), polydimethylsiloxane (PDMSO) or its prepolymer, or its copolymer, or its blend.

For the numerical range given in the specification, when the numerical range is defined as an "integer", it should be understood that the two endpoints of the range and each integer within the range are given. For example, "an integer of 0 to 10" should be understood as meaning each integer of 0, 1, 2, 3, 4, 5, 6, 7, 8, 9, and 10. When the numerical range is defined as a "number", it should be understood that the two endpoints of the range, each integer within the range and each fraction within the range are given. For example, "a number of 0 to 10" should be understood as meaning not only every integer of 0, 1, 2, 3, 4, 5, 6, 7, 8, 9, and 10, but also at least a sum of each integer with 0.1, 0.2, 0.3, 0.4, 0.5, 0.6, 0.7, 0.8, 0.9, respectively.

As used herein, "halogen" refers to fluoro, chloro, bromo and iodo.

As used herein, "alkyl" used alone or as a suffix or prefix in the present invention is intended to include a branched and straight-chain saturated aliphatic hydrocarbon having 1 to 20 carbon atoms, preferably 1 to 6 carbon atoms (or a specific number if a specific number of carbon atoms is provided). For example, "$C_{1-6}$ alkyl" denotes a straight-chain and branched alkyl group having 1, 2, 3, 4, 5 or 6 carbon atoms. Exemplary alkyl groups include, but are not limited to, methyl, ethyl, n-propyl, isopropyl, n-butyl, isobutyl, sec-butyl, tert-butyl, pentyl, and hexyl.

As used herein, "haloalkyl" or "alkyl halide" as used alone or as a suffix or prefix in the present invention is intended to include a branched and straight-chain saturated aliphatic hydrocarbon having at least one halogen substituent and 1 to 20 carbon atoms, preferably 1 to 6 carbon atoms (or a specific number if a specific number of carbon atoms is provided). For example, "$C_{1-10}$ haloalkyl" denotes a haloalkyl group having 0, 1, 2, 3, 4, 5, 6, 7, 8, 9, 10 carbon atoms. Exemplary haloalkyl groups include, but are not limited to, fluoromethyl, difluoromethyl, trifluoromethyl, chlorofluoromethyl, 1-fluoroethyl, 3-fluoropropyl, 2-chloropropyl, 3,4-difluorobutyl, etc.

As used herein, "alkenyl" used alone or as a suffix or prefix in the present invention is intended to include a branched and straight-chain aliphatic hydrocarbon including alkenyl or alkene having 2 to 20 carbon atoms, preferably 2 to 6 carbon atoms (or a specific number if a specific number of carbon atoms is provided). For example, "$C_{2-6}$ alkenyl" denotes an alkenyl group having 2, 3, 4, 5 or 6 carbon atoms. Exemplary alkenyl groups include, but are not limited to, vinyl, allyl, 1-propenyl, 1-butenyl, 2-butenyl, 3-butenyl, 2-methylbut-2-enyl, 3-methylbut-1-enyl, 1-pentenyl, 3-pentenyl and 4-hexenyl. As used herein, "alkynyl" used alone or as a suffix or prefix in the present invention is intended to include a branched and straight-chain aliphatic hydrocarbon including alkynyl or alkyne having 2 to 20 carbon atoms, preferably 2 to 6 carbon atoms (or a specific number if a specific number of carbon atoms is provided), such as ethynyl, propynyl (e.g., 1-propynyl, 2-propynyl), 3-butynyl, pentynyl, hexynyl, and 1-methylpent-2-ynyl.

The term "aryl" as used herein refers to an aromatic cyclic structure composed of 5 to 20 carbon atoms. For example, an aromatic cyclic structure containing 5, 6, 7 and 8 carbon atoms can be a monocyclic aromatic group such as a phenyl group; a cyclic structure containing 8, 9, 10, 11, 12, 13 or 14 carbon atoms can be polycyclic such as naphthyl. The aromatic ring can replace the above substituents at one or more ring positions. The term "aryl" also includes a polycyclic ring system having two or more rings, wherein two or more carbons are shared by two adjacent rings (the ring is a "fused ring"), wherein at least one of these rings is aromatic and the other rings can be, for example, cycloalkyl, cycloalkenyl, cycloalkynyl, aryl and/or heterocyclyl groups. Exemplary polycyclic rings include, but are not limited to, 2,3-dihydro-1,4-benzodioxine and 2,3-dihydro-1-benzofuran.

The term "cycloalkyl" as used herein is intended to include a saturated cyclic group having a specified number of carbon atoms. These terms can include fused or bridged polycyclic systems. The cycloalkyl group has 3 to 40 carbon atoms in its ring structure. In one embodiment, the cycloalkyl group has 3, 4, 5 or 6 carbon atoms in its ring structure. For example, "$C_{3-6}$ cycloalkyl" represents a group such as cyclopropyl, cyclobutyl, cyclopentyl or cyclohexyl.

As used herein, "heteroaryl" refers to a heteroaromatic heterocycle having at least one ring hetero atom (e.g., sulfur, oxygen or nitrogen). The heteroaryl groups include monocyclic systems and polycyclic systems (e.g., having 2, 3 or 4 fused rings). Exemplary heteroaryl groups include, but are not limited to, pyridyl, pyrimidinyl, pyrazinyl, pyridazinyl, triazinyl, furyl, quinolyl, isoquinolyl, thienyl, imidazolyl, thiazolyl, indolyl, pyrrolyl, oxazolyl, benzofuranyl, benzothienyl, benzothiazolyl, isoxazolyl, pyrazolyl, triazolyl, tetrazolyl, indazolyl, 1,2,4-thiadiazolyl, isothiazolyl, benzothienyl, purinyl, carbazolyl, benzimidazolyl, benzoxazolyl, azabenzoxazolyl, imidazothiazolyl, benzo[1,4]dioxacyclohexenyl, benzo [1,3] dioxacyclopentenyl, etc. In some embodiments, a heteroaryl group has 3 to 40 carbon atoms and in other embodiments 3 to 20 carbon atoms. In some embodiments, a heteroaryl group contains 3 to 14, 4 to 14, 3 to 7, or 5 to 6 ring atoms. In some embodiments, a heteroaryl group has 1 to 4, 1 to 3 or 1 to 2 heteroatoms. In some embodiments, a heteroaryl group has 1 heteroatom.

Unless otherwise specified, as used herein, the term "heterocyclyl" refers to a saturated, unsaturated or partially saturated monocyclic, bicyclic or tricyclic ring containing 3 to 20 atoms, wherein 1, 2, 3, 4 or 5 ring atoms are selected from nitrogen, sulfur or oxygen, and unless otherwise specified, can be connected with carbon or nitrogen, wherein the —$CH_2$— group is optionally replaced by —C(O)—; and unless stated to the contrary, the nitrogen atom or the sulfur atom in a ring is optionally oxidized to the corresponding N-oxide or S-oxide, or the nitrogen atom in a ring optionally quaternized; wherein —NH in the ring is optionally replaced by acetyl, formyl, methyl or a methylsulfonyl group; and the ring is optionally substituted with one or more halogens. It should be understood that when the total number of S atoms and O atoms in the heterocyclyl group is greater than 1, these heteroatoms are not adjacent to each other. If the heterocyclyl group is bicyclic or tricyclic, at least one of the rings can be optionally heteroaromatic or aromatic, provided that at least one of the rings is non-heteroaromatic. If the heterocyclyl group is monocyclic, it should not be aromatic. Exemplary heterocyclyl groups include, but are not limited to, piperidinyl, N-acetylpiperidinyl, N-methylpiperidinyl, N-formylpiperazinyl, N-methylsulfonylpiperazinyl, homopiperazinyl, piperazinyl, azetidinyl, oxetanyl, morpholinyl, tetrahydroisoquinolinyl, tetrahydroquinolyl, indanyl, tetrahydropyranyl, dihydro-2H-pyranyl, tetrahydrofuranyl, tetrahydrothiopyranyl, tetrahydrothiopyran-1-oxide, tetrahydrothiopyran-1,1-dioxide, 1H-pyridin-2-one and 2,5-dioxoimidazolidinyl.

Hereinafter, the present invention is further described in detail with reference to the specific embodiments. It should be understood that the examples are not intended to limit the scope of the present invention. In addition, it should be understood that after reading the content of the present invention, a person skilled in the art can make various changes and modifications to the present invention, and these equivalents are also deemed to fall under the scope of the present invention.

Preparation Example 1

Preparation of Thin Solid Electrolyte Membrane

Grinding and mixing lithium bis(trifluoromethanesulfonyl)imide (LiTFSI):poly(ethylene oxide) (PEO):tetraethylene glycol dimethyl ether (TEGDME):benzophenone (MBP) in a ratio of 10:41.3:41.2:7.5, and then uniformly coating on a Teflon plate to obtain a thin membrane, which is cross-linked by ultraviolet irradiation to obtain a thin solid electrolyte membrane having a conductivity of about $10^{-3}$ S/cm at room temperature. The specific preparation method of the thin solid electrolyte membrane refers to the method described by Luca Porcarelli et al. Super Soft All-Ethylene Oxide Polymer Electrolyte for Safe All-Solid Lithium Batteries. Scientific Reports, 2016, 6, 1-14.

Example 1

(1) Preparation of Gelable System

Weighing 1.2 g of lithium fluorosulfonimide in a reagent bottle, adding 1.5 mL of a conventional lithium battery electrolyte (a mixed solution of dimethyl carbonate (DMC) and ethylene carbonate (EC) containing 1 mol/L $LiPF_6$, wherein the volume ratio of dimethyl carbonate (DMC) and ethylene carbonate (EC) is 1:1), dissolving the lithium salt completely under magnetic stirring, then adding 5.5 mL of tetrahydropyran to the above mixed solution, mixing sufficiently, and letting stand for use.

(2) Preparation of Battery Materials and Battery Assembly

Positive electrode of a lithium-ion battery: uniformly mixing lithium cobalt oxide with conductive graphite, acetylene black conductive agent, polyvinylidene fluoride (PVDF) binder in a mass ratio of 85:5:5:5, and preparing the mixture into a slurry with N-methyl-pyrrolidone (NMP), which is uniformly coated on an aluminum foil, dried in a vacuum oven at 120° C. for 24 hours, and ready for use;

negative electrode of the lithium-ion battery: lithium foil;

infiltrating the positive electrodes and negative electrodes in the above-prepared unsolidified electrolyte solution, respectively, before the formation of the solid electrolyte, taking out the infiltrated positive electrodes and negative electrodes.

Separator: polypropylene (PP) porous membrane;

placing the separator between the positive and negative electrodes infiltrated with the electrolyte solution, then injecting the above-mentioned unsolidified electrolyte solution into the interior of the battery, pressing and encapsulating, letting stand still until the electrolyte formed the solid electrolyte, and testing the electrochemical performance of the battery using the LAND batteries test system.

The performance parameters of the prepared solid electrolyte and battery are listed in Table 1.

Example 2

(1) Preparation of Gelable System

Weighing 0.75 g of lithium chloroaluminate and 0.1 g of lithium bisfluorosulfonimide in a reagent bottle, adding 1.2 mL of triethylene glycol dimethyl ether, dissolving lithium chloroaluminate and lithium bisfluorosulfonimide completely under magnetic stirring, then adding 2.5 mL of tetrahydropyran and 1.2 mL of 1,3-dioxolane, mixing sufficiently, and letting stand for use.

(2) Preparation of Battery Materials and Battery Assembly

Positive electrode of a lithium-sulfur battery: uniformly mixing carbon-sulfur composite material with acetylene black conductive agent, polyvinylidene fluoride (PVDF) binder in a mass ratio of 8:1:1, and preparing the mixture into a slurry with N-methyl-pyrrolidone (NMP), which is uniformly coated on an aluminum foil, dried in a vacuum oven at 60° C. for 24 hours, and ready for use;

negative electrode of the lithium-sulfur battery: sufficiently mixing 90.5 parts of the negative electrode active material conductive graphite, 6 parts of acetylene black, 1 part of hydroxymethyl cellulose, and 2.5 parts of styrene-butadiene rubber binder with an ethanol-water mixed solution to obtain a negative electrode slurry, which is coated on a copper foil, and dried in a vacuum oven at 60° C. for 24 hours, and ready for use;

infiltrating the above-obtained positive electrodes and negative electrodes in the above-prepared unsolidified electrolyte solution, respectively, before the formation of the solid electrolyte, taking out the infiltrated positive electrodes and negative electrodes.

Separator: polypropylene (PP) porous membrane;

placing the separator between the positive and negative electrodes infiltrated with the electrolyte solution, then injecting the above-mentioned unsolidified electrolyte solution into the interior of the battery, pressing and encapsulating, letting stand still until the electrolyte formed the solid electrolyte, and testing the electrochemical performance of the battery using the LAND batteries test system.

The performance parameters of the prepared solid electrolyte and battery are listed in Table 1.

Example 3

The preparation methods of the positive electrode, the negative electrode and the solid electrolyte are the same as in Example 1. The positive and negative electrodes are also infiltrated with the electrolyte solution before the formation of the solid electrolyte in Example 1, except that the thin solid electrolyte membrane prepared in the above Preparation Example 1 is used to replace the polypropylene separator, and the above-mentioned unsolidified electrolyte solution is not injected into the interior of the battery for encapsulating the battery. The processes of standing and battery testing are the same as in Example 1, and the performance parameters of the battery are listed in Table 1.

Example 4

The preparation methods of the positive electrode, the negative electrode and the solid electrolyte are the same as in Example 2. The positive and negative electrodes are also infiltrated with the electrolyte solution before the formation of the solid electrolyte in Example 2, except that the thin solid electrolyte membrane prepared in the above Preparation Example 1 is used to replace the polypropylene separator, and the above-mentioned unsolidified electrolyte solution is not injected into the interior of the battery for encapsulation the battery. The provesses of standing and battery testing are the same as in Example 2, and the performance parameters of the battery are listed in Table 1.

Example 5

The preparation methods of the positive electrode, the negative electrode and the solid electrolyte are the same as in Example 3, except that the positive and negative electrodes are not infiltrated with the electrolyte solution before the formation of the solid electrolyte, the thin solid electrolyte membrane prepared in the above Preparation Example 1 is used to replace the polypropylene separator, and the above-mentioned unsolidified electrolyte solution is not injected into the interior of the battery for encapsulating the battery. The processes of standing and battery testing are the same as in Example 3, and the performance parameters of the battery are listed in Table 1.

Example 6

The preparation methods of the positive electrode, the negative electrode and the solid electrolyte are the same as in Example 4, except that the positive and negative electrodes are not infiltrated with the electrolyte solution before the formation of the solid electrolyte, the thin solid electrolyte membrane prepared in the above Preparation Example 1 is used to replace the polypropylene separator, and the above-mentioned unsolidified electrolyte solution is not injected into the interior of the battery for encapsulating the battery. The processes of standing and battery testing are the same as in Example 4, and the performance parameters of the battery are listed in Table 1.

Example 7

(1) Preparation of Gelable System

Weighing 0.05 g of aluminum oxide in a reagent bottle, adding 4.5 mL of 3,3-dichloromethyloxetane, sufficiently and uniformly mixing under magnetic stirring, and obtaining a mixed solution A. Weighing another 0.4 g of lithium fluorosulfonimide and 0.6 g of lithium perchlorate in a reagent bottle, adding 1.2 mL of a conventional electrolyte for lithium-sulfur batteries, stirring until the lithium salts are completely dissolved, and obtaining a mixed solution B. Mixing the solution A and B obtained above sufficiently to obtain a mixed solution, and after mixing sufficiently, letting stand for use.

(2) Preparation of Battery Materials and Battery Assembly

Positive electrode of a lithium-ion battery: uniformly mixing lithium iron phosphate with conductive graphite, acetylene black conductive agent, polyvinylidene fluoride (PVDF) binder in a mass ratio of 85:5:5:5, and preparing the mixture into a slurry with N-methyl-pyrrolidone (NMP), which is uniformly coated on an aluminum foil, dried in a vacuum oven at 120° C. for 24 hours, and ready for use;

negative electrode of the lithium-ion battery: lithium foil;

infiltrating the positive electrodes and negative electrodes in the above-prepared unsolidified electrolyte solution, respectively, and before the formation of the solid electrolyte, taking out the infiltrated positive and negative electrodes.

Scraping the above gelable system onto a glass plate, letting stand until it is polymerized into a solid electrolyte membrane, scraping off with a blade, placing between the above-obtained positive and negative electrodes, then pressing and encapsulating the battery, letting stand still until the electrolyte solution formed the solid electrolyte, and testing the electrochemical performance of the battery using the LAND batteries test system.

The performance parameters of the prepared solid electrolyte and battery are listed in Table 1.

Example 8

(1) Synthesis of Polyester

Weighing 15.0 g of glutaric acid, 10.0 g of butenedioic acid, 20.0 g of polyethylene glycol-400, and 10.0 g of 1,4-butanediol in a three-necked flask, heating in an oil bath until the temperature reached 140° C., keep at the constant temperature for 1.5 h, raising the temperature by 20° C. every 20 minutes until 220° C., keep at the constant temperature for 2 h, then adding a catalyst of 0.2 g tetrabutyl titanate and an inhibitor of 0.2 g p-hydroxyphenol, react for 50 minutes, vacuum for 1 h, cooling down to obtain a crude product, to which is added 50.0 mL of chloroform, stirred at room temperature for 24 h, precipitated in ethanol, and dried in a vacuum oven at 60° C. for 24 h to obtain polyester D that is stored in a glove box.

(2) Preparation of Gelable System and Solid Electrolyte

Weighing 1.0 mL of polyester D, 4.67 mL of tetrahydrofuran, stirring and mixing to obtain a clear and transparent solution, then adding 1.0 g of lithium fluorosulfonimide after homogeneously mixing, stirring for 1 h to dissolve lithium fluorosulfonimide in the above mixed solution completely, obtaining a gelable system; continually stir for 2 h, and then letting stand for use.

(3) Preparation of Battery Materials and Battery Assembly

Positive electrode of a lithium-ion battery: uniformly mixing lithium iron phosphate with conductive graphite, acetylene black conductive agent, the gelable system prepared in above step (2) in a mass ratio of 85:5:5:5, and preparing the mixture into a slurry with N-Methyl-pyrrolidone (NMP), which is uniformly coated on an aluminum foil, dried in a vacuum oven at 120° C. for 24 hours, and ready for use;

negative electrode of a lithium ion battery: lithium foil;

separator: polypropylene (PP) porous membrane;

placing the separator between the positive and negative electrodes infiltrated with the electrolyte solution, then injecting the above-mentioned unsolidified electrolyte solution into the interior of the battery, pressing and encapsulating, letting stand still until the electrolyte formed the solid electrolyte, and testing the electrochemical performance of the battery using the LAND batteries test system.

The performance parameters of the prepared solid electrolyte and battery are listed in Table 1.

Example 9

(1) Preparation of Gelable System

Weighing 0.4 g of lithium tetrafluoroborate in a reagent bottle, adding 2.0 mL of a mixed solution of dimethyl carbonate and ethylene carbonate, stirring to dissolve the lithium salt completely, adding 1.0 mL of tetrahydrofuran to the above lithium salt solution, and after stirring and mixing sufficiently, obtaining a gelable system; letting stand for use.

(2) Preparation of Battery Materials and Battery Assembly

Positive electrode of a lithium-ion battery: uniformly mixing lithium iron phosphate with conductive graphite, acetylene black conductive agent, polyvinylidene fluoride (PVDF) binder in a mass ratio of 85:5:5:5, and preparing the mixture into a slurry with N-methyl-pyrrolidone (NMP), which is uniformly coated on an aluminum foil, dried in a vacuum oven at 120° C. for 24 hours, and ready for use;

negative electrode of the lithium-ion battery: lithium foil;

separator: polypropylene (PP) porous membrane;

placing the separator between the above positive and negative electrodes, then injecting the precursor electrolyte solution of the above quasi-solid electrolyte into the interior of the battery, pressing and encapsulating the battery, letting stand still until the electrolyte formed the electrolyte, and testing the electrochemical performance of the battery using the LAND batteries test system.

The performance parameters of the prepared quasi-solid electrolyte and battery are listed in Table 1.

Example 10

(1) Preparation of Gelable System

Weighing 0.2 g of zinc oxide in a reagent bottle, adding 6.0 mL of 1,3-dioxolane and 3.0 mL of tetrahydropyran, sufficiently and uniformly mixing under magnetic stirring, and obtaining a mixed solution A. Weighing another 0.5 g of lithium trifluoromethanesulfonate and 1.5 g lithium hexafluoroarsenate in a reagent bottle, adding 2.4 mL of dimethyl carbonate, stirring until the lithium salts are completely dissolved, and obtaining a mixed solution B. Mixing the solution A and B obtained above sufficiently to obtain a mixed solution, and obtaining a gelable system; letting stand for use.

(2) Preparation of Solid Electrolyte Membrane

Scraping the gelable system in step (1) on a clean glass plate, letting stand, and after it is solidified, gently peeling off with a blade to be ready for use.

(3) Preparation of Battery Materials and Battery Assembly

Positive electrode of a lithium-ion battery: uniformly mixing lithium iron phosphate with conductive graphite, acetylene black conductive agent, the gelable system prepared in above step (1) in a mass ratio of 85:5:5:5, and preparing the mixture into a slurry, which is uniformly coated on an aluminum foil, dried in a vacuum oven at 60° C. for 24 hours, and ready for use;

negative electrode of the lithium-ion battery: lithium foil;

placing the solid electrolyte membrane between the above positive and negative electrodes containing the gelable system, then pressing and encapsulating the battery, letting stand still until the electrolyte solution formed the solid electrolyte, and testing the electrochemical performance of the battery using the LAND batteries test system.

The performance parameters of the prepared quasi-solid electrolyte and battery are listed in Table 1.

Example 11

(1) Preparation of Gelable System

Weighing 0.2 g of lithium tetrafluoroborate solid, 0.2 g of lithium bis(trifluoromethanesulfonyl)imide solid and 0.4 g of lithium bis(oxalate)borate solid in a reagent bottle, adding 2.0 mL of 1,4-epoxycyclohexane and 8.0 mL of tetrahydrofuran, preparing a lithium tetrafluoroborate+lithium bis(trifluoromethanesulfonyl)imide+lithium bis(oxalate)borate/1,4-epoxycyclohexane+tetrahydrofuran solution containing 8 wt % lithium salts under magnetic stirring, and obtaining a gelable system; continuously stirring until the lithium salts are completely dissolved, letting stand for use.

(2) Preparation of Battery Materials and Battery Assembly

Positive electrode of a lithium-ion battery: uniformly mixing lithium iron phosphate with conductive graphite, acetylene black conductive agent, the gelable system prepared in above step (1) in a mass ratio of 85:5:5:5, and preparing the mixture into a slurry, which is uniformly coated on an aluminum foil, dried in a vacuum oven at 60° C. for 24 hours, and ready for use;

negative electrode of the lithium-ion battery: lithium foil;

separator: polypropylene (PP) porous membrane;

placing the separator between the above positive and negative electrodes containing the gelable system, then injecting the gelable system obtained in step (1), pressing and encapsulating the battery, letting stand still until the electrolyte solution formed the semi-solid electrolyte, and testing the electrochemical performance of the battery using the LAND batteries test system. The performance parameters of the prepared quasi-solid electrolyte and battery are listed in Table 1.

TABLE 1

Performance parameters of solid electrolytes and batteries prepared in Examples 1-11

| Example | Are positive and negative electrodes infiltrated? | Separator type | Is it necessary to inject electrolyte? | Conductivity of solid electrolyte/ $S \cdot cm^{-1}$ | Initial discharge specific capacity mAh/g | Rate capability of battery (Cyclic residual specific capacity mAh/g) |
|---|---|---|---|---|---|---|
| 1 | yes | polypropylene microporous membrane | yes | $2.44 \times 10^{-5}$ | 124 | residual 126 after 25 cycles |
| 2 | yes | polypropylene microporous membrane | yes | $4.17 \times 10^{-6}$ | 1324 | residual 756 after 25 cycles |
| 3 | yes | thin solid electrolyte membrane | no | $2.44 \times 10^{-5}$ | 114 | residual 118 after 25 cycles |
| 4 | yes | thin solid electrolyte membrane | no | $4.17 \times 10^{-6}$ | 1297 | residual 768 after 25 cycles |
| 5 | no | thin solid electrolyte membrane | no | $2.44 \times 10^{-5}$ | 120 | residual 116 after 25 cycles |
| 6 | no | thin solid electrolyte membrane | no | $4.17 \times 10^{-6}$ | 1174 | residual 391 after 25 cycles |
| 7 | yes | thin solid electrolyte membrane | no | $2.38 \times 10^{-5}$ | 118 | residual 116 after 66 cycles |
| 8 | no | polypropylene microporous membrane | yes | $2.5 \times 10^{-4}$ | 113 | residual 118 after 66 cycles |
| 9 | no | polypropylene microporous membrane | yes | $4.22 \times 10^{-4}$ | 121 | residual 125 after 66 cycles |
| 10 | no | thin solid electrolyte membrane | no | $3.87 \times 10^{-4}$ | 122 | residual 127 after 66 cycles |
| 11 | no | polypropylene microporous membrane | yes | $3.26 \times 10^{-3}$ | 126 | residual 129 after 66 cycles |

FIG. 1 is a graph showing the rate capability of the battery obtained by the assembly method in Example 2. As shown in the figure, the infiltrated positive and negative electrodes with the separator, after a certain amount of the electrolyte solution before the formation of the solid electrolyte is added, exhibits a better rate capability.

Figure 2:
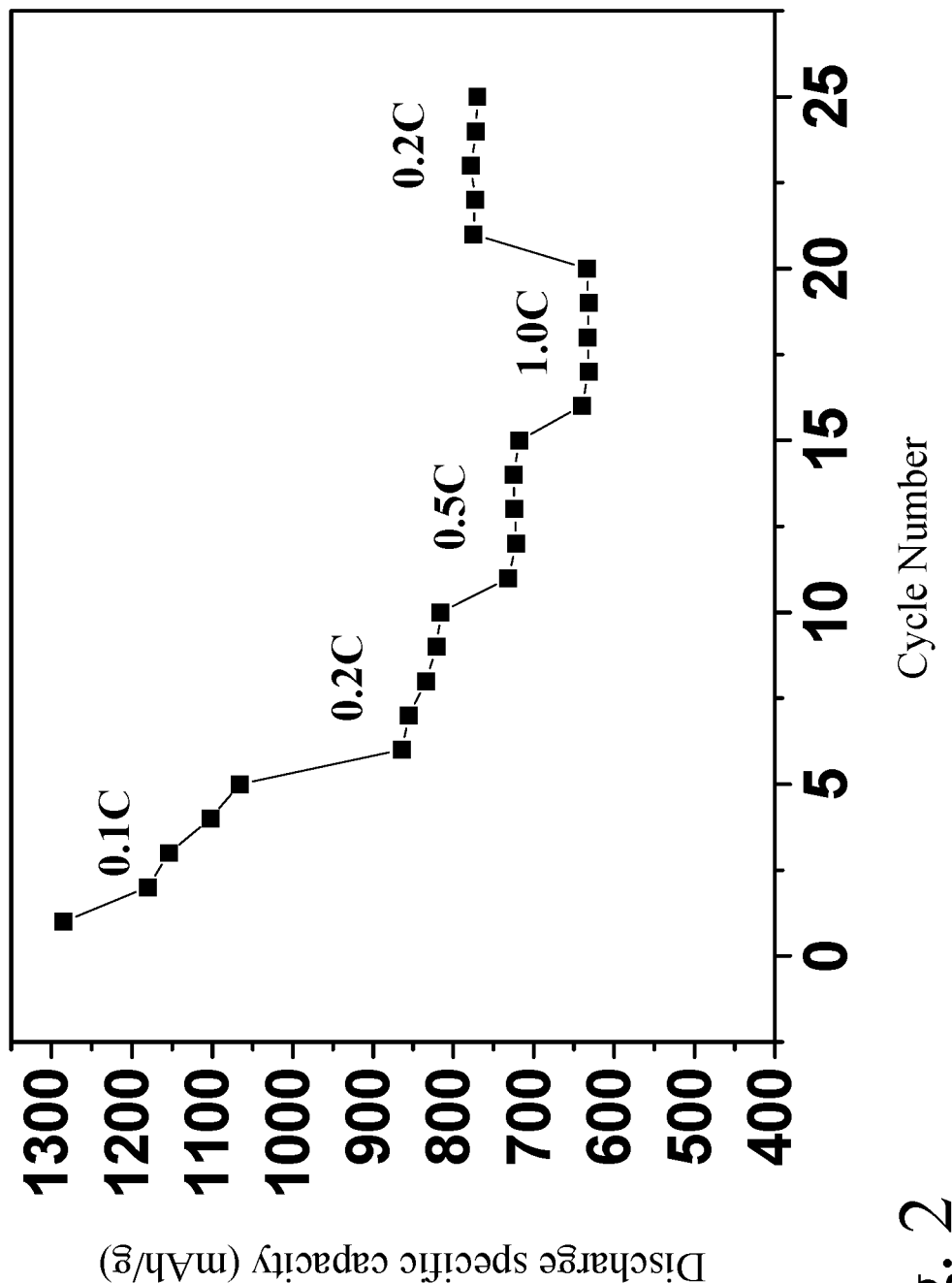
FIG. 2 is a graph showing the rate capability of the battery obtained by the assembly method in Example 4.

FIG. 2 is a graph showing the rate capability of the battery obtained by the assembly method in Example 4. As shown in the figure, the infiltrated positive and negative electrodes, which are separated by the solid electrolyte membrane, exhibit a better rate capability.

Figure 3:
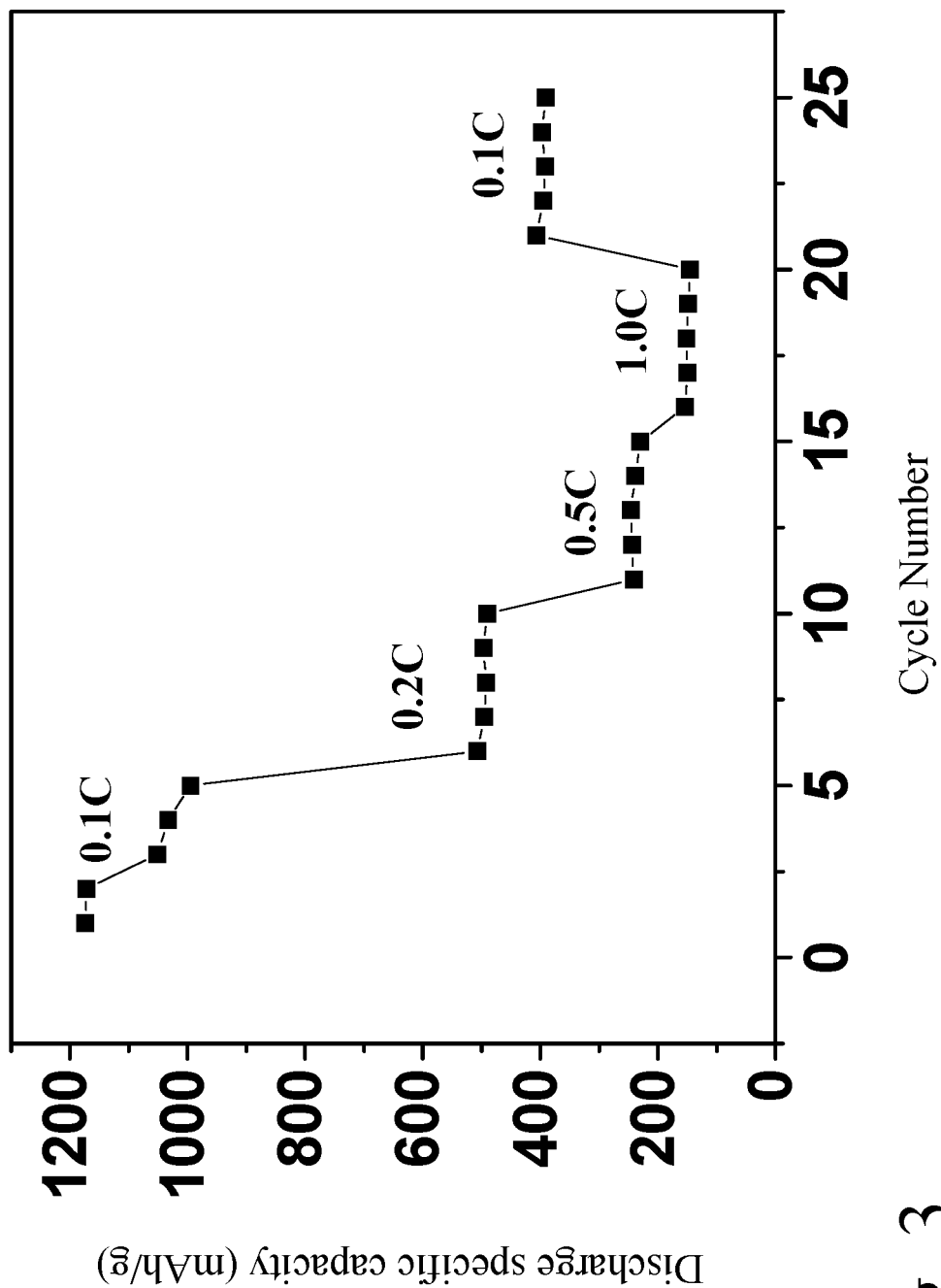
FIG. 3 is a graph showing the rate capability of the battery obtained by the assembly method in Example 6.

FIG. 3 is a graph showing the rate capability of the battery obtained by the assembly method in Example 6. As shown in the figure, the uninfiltrated positive and negative electrodes, which are separated by the pure solid electrolyte membrane acting as a surface conductor, exhibit a poor rate capability.

Figure 4:
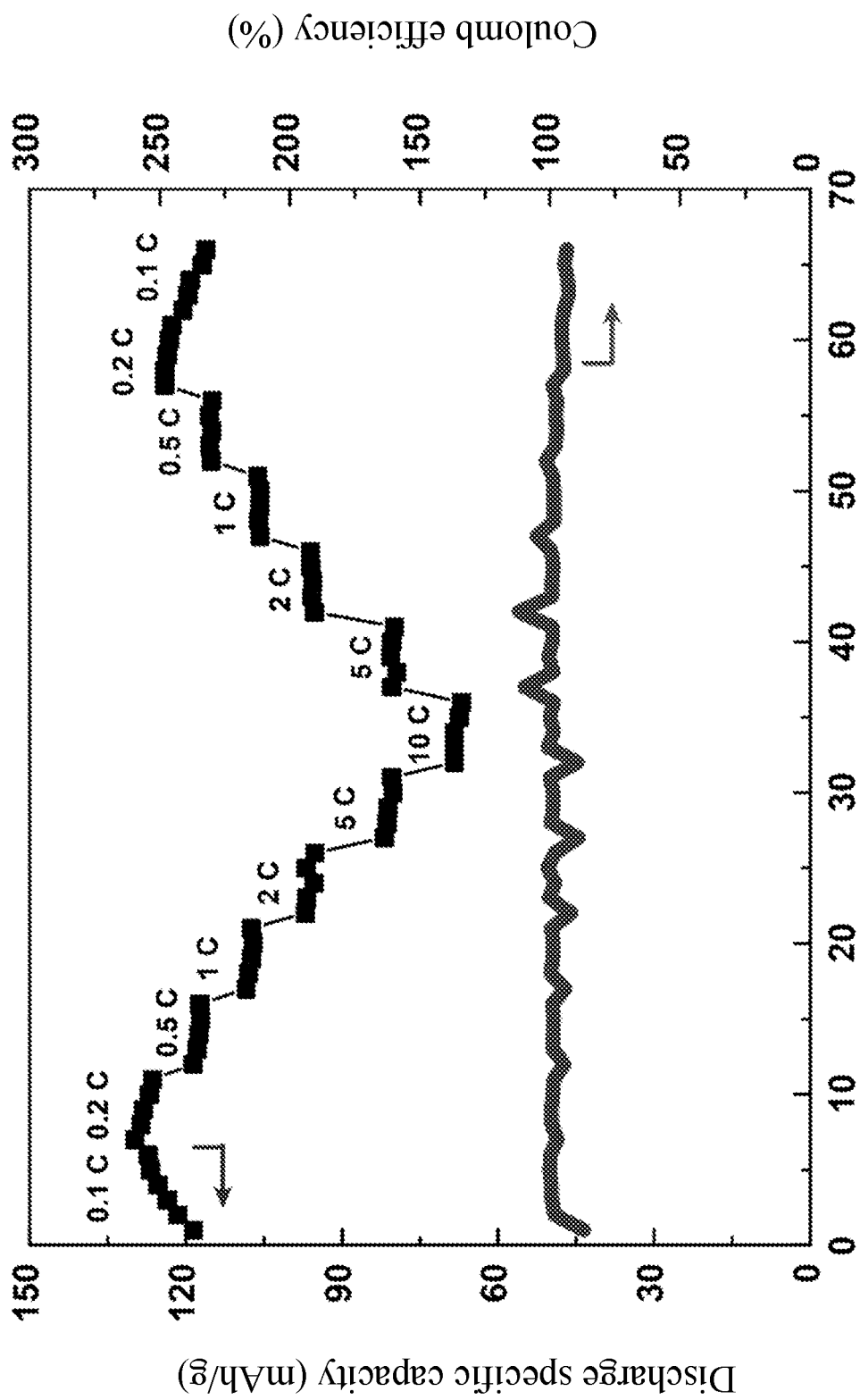
FIG. 4 is a graph showing the rate capability of the battery obtained by the assembly method in Example 7.

FIG. 4 is a graph showing the rate capability of the battery obtained by the assembly method in Example 7. As shown in the figure, the positive and negative electrodes are infiltrated in the gelable system, wherein an ion conducting network can be formed inside the battery, and the solid electrolyte replacing the separator form the solid battery, which exhibit an excellent rate capability, and a good performance even at 10 C.

Figure 5:
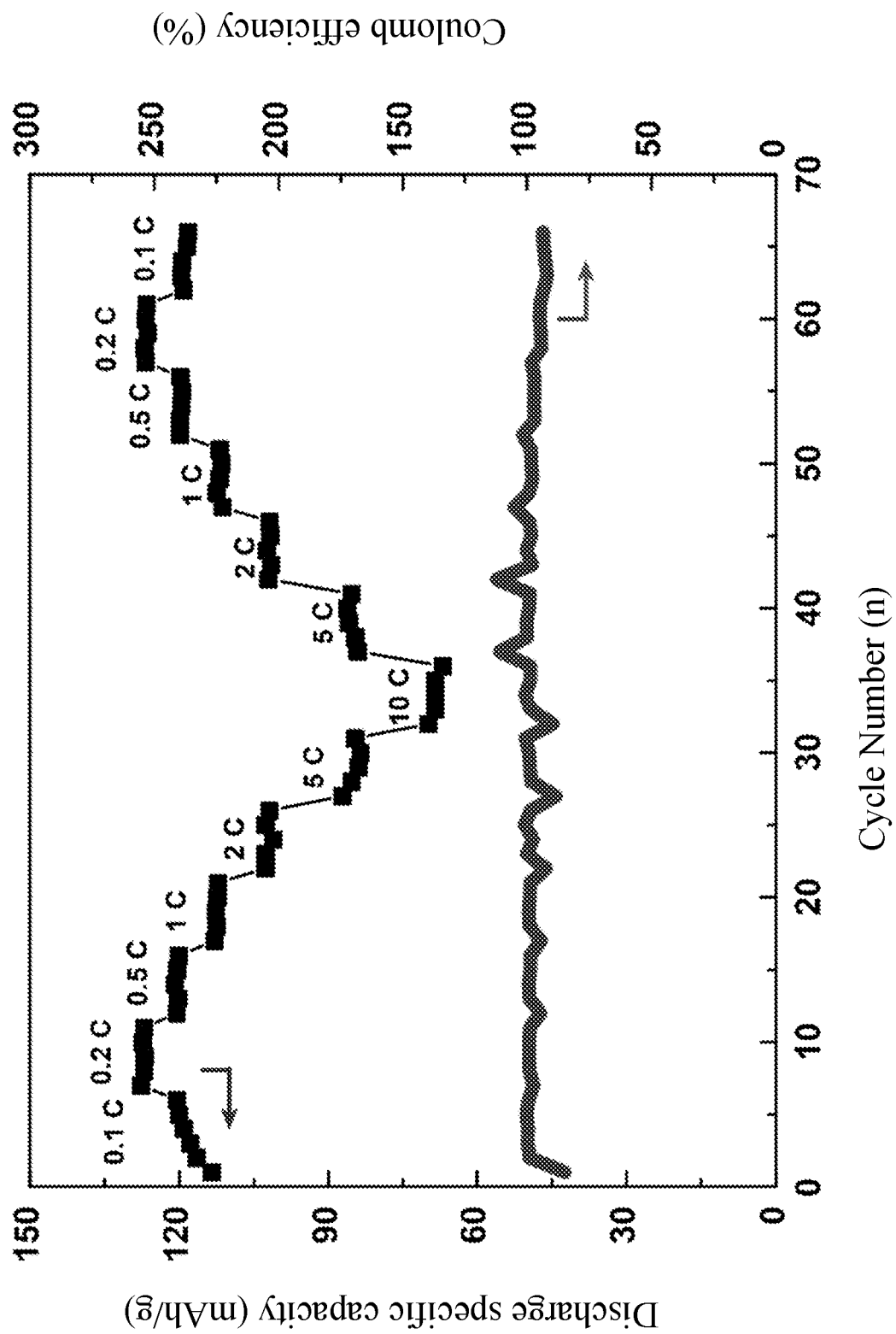
FIG. 5 is a graph showing the rate capability of the battery obtained by the assembly method in Example 8.

FIG. 5 is a graph showing the rate capability of the battery obtained by the assembly method in Example 8. As shown in the figure, in the preparation process of the positive electrode, when the gelable system replaces the conventional binder, not only the surface density of the active material is increased, but also an excellent ion conducting network is formed inside the electrode, and the battery exhibits an excellent rate capability.

As can be seen in Table 1, compared to the battery assembled with the uninfiltrated positive and negative electrodes, the battery assembled with the positive and negative electrodes infiltrated with the precursor solution of the solid electrolyte exhibits an excellent rate capability, indicating that a conducting network is formed inside the infiltrated positive and negative electrodes, which is beneficial to the electron and ion transport, and can withstand high rates of charge and discharge. However, no conducting network is formed inside the uninfiltrated positive and negative electrodes, and the electrochemical performance of the battery can only be achieved by transporting electrons and ions at the contact area between the electrodes and the solid electrolyte, so it exhibits a poor rate capability.

The embodiments of the present invention have been described above. However, the present invention is not limited to the above embodiments. Any modification made within the spirit and scope of the present invention, equivalent substitution, improvement, etc., should be included within the scope of the present invention.

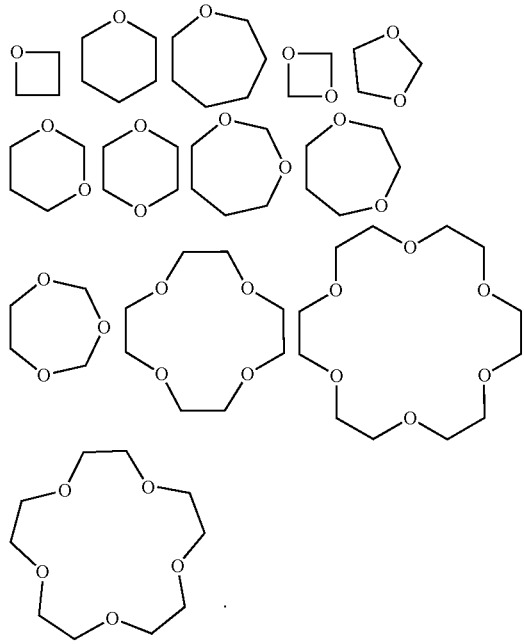

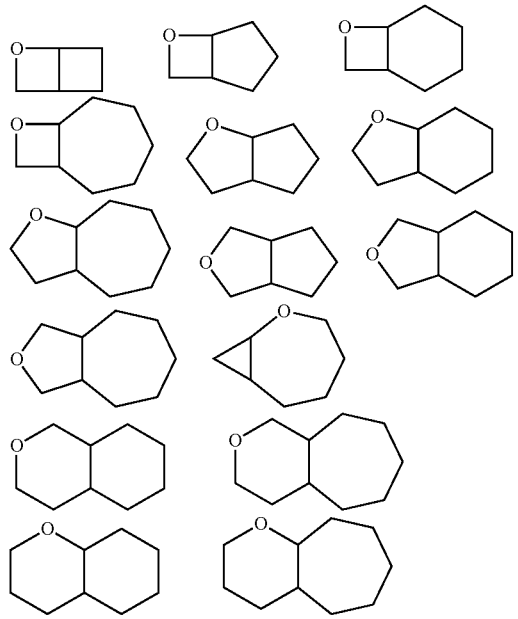

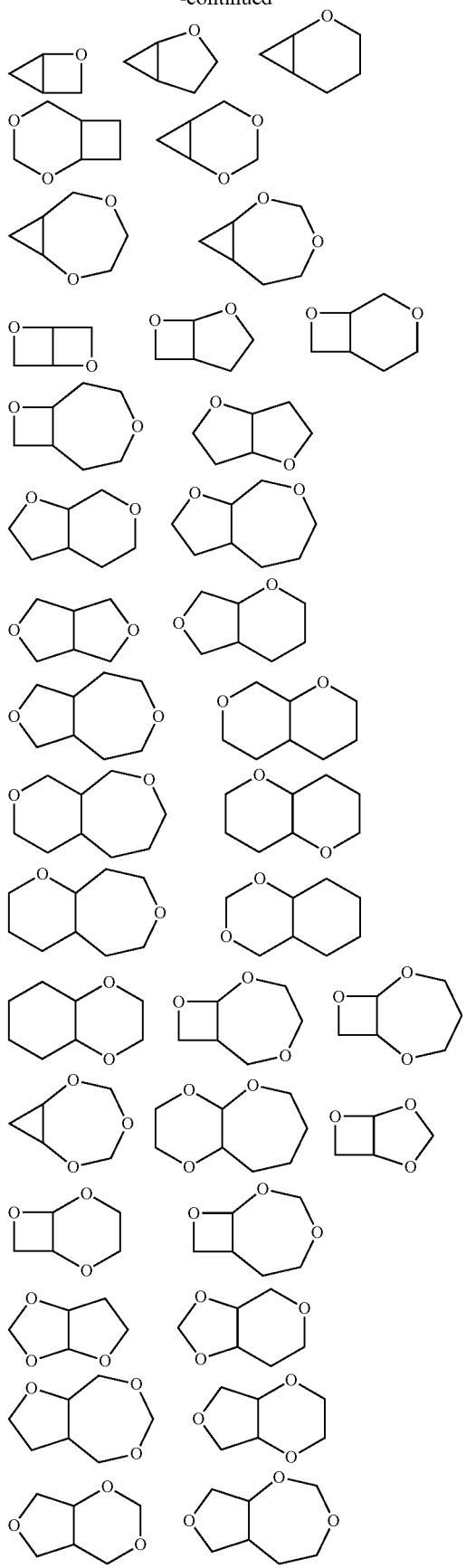

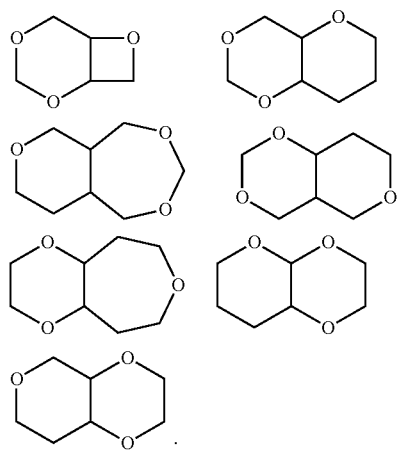
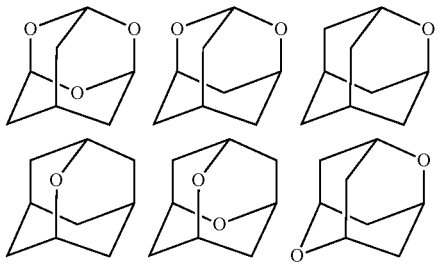
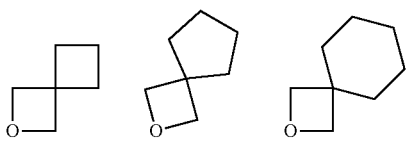
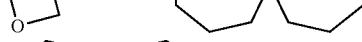
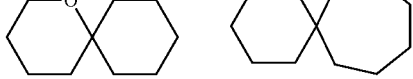
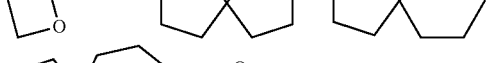
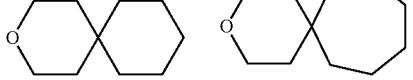
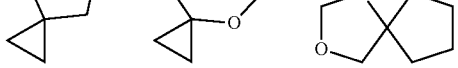

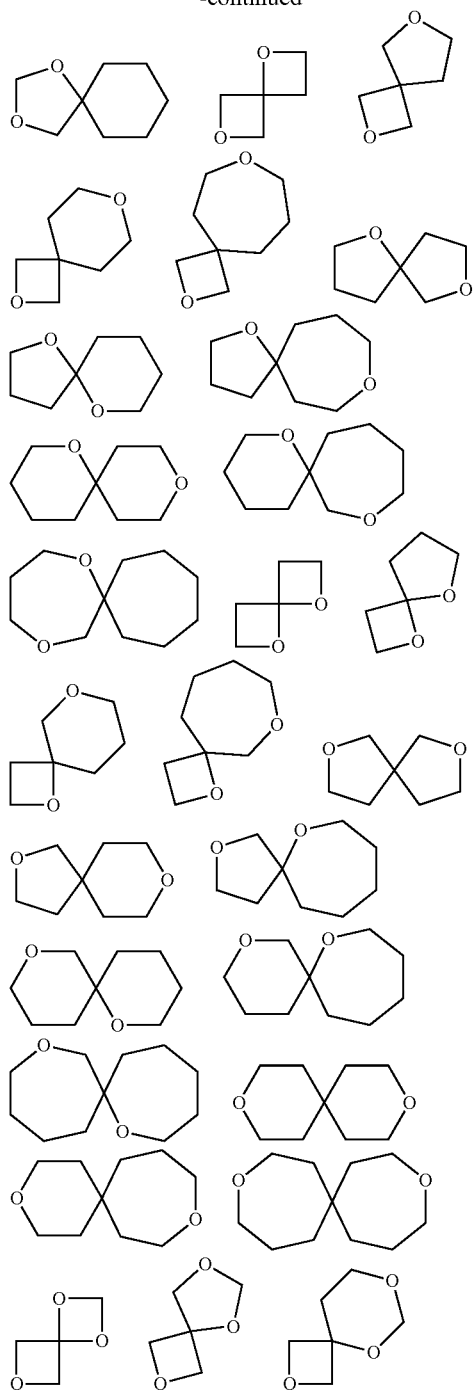
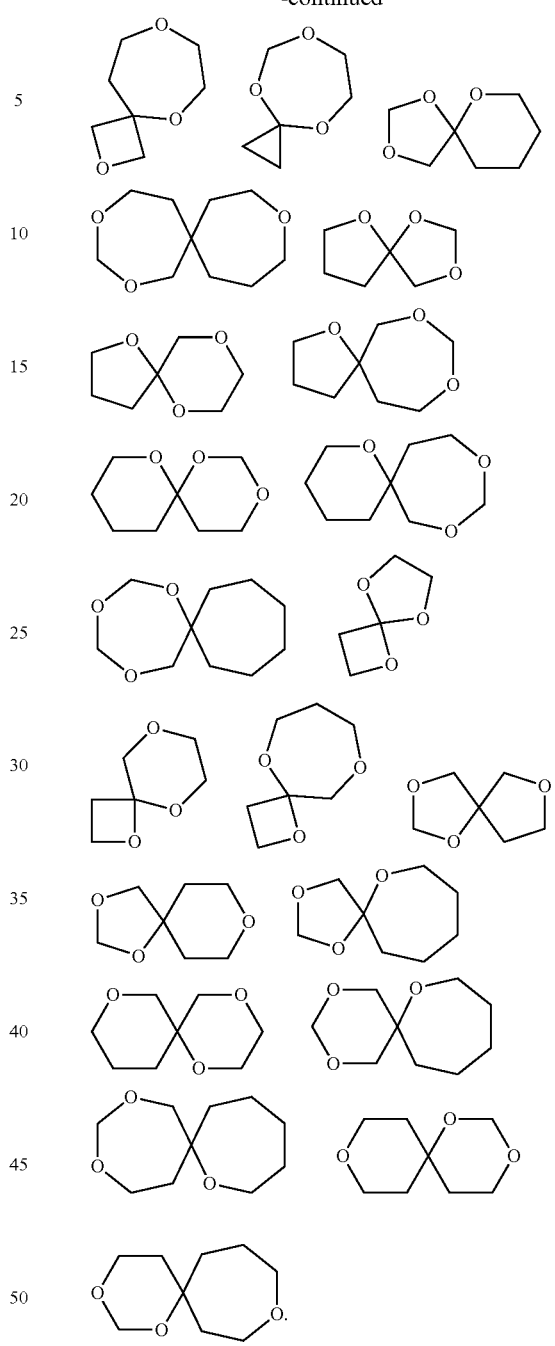

The invention claimed is:
1. A method for preparing a flexible all-solid-state lithium-ion secondary battery, comprising:
   1a) preparing a gelable system;
   2a) assembling one or more negative electrodes, one or more separator, and one or more positive electrodes to obtain an assembled battery;
   3a) injecting the gelable system of step 1a) into the assembled battery, sealing, and standing still, wherein the gelable system forms a gel electrolyte inside the assembled battery to obtain the flexible all-solid-state lithium-ion secondary battery,
   wherein the gelable system comprises a lithium salt, an ether compound selected from tetrahydrofuran, 1,3,5-trioxacyclohexane, and 3,3-dichloromethyloxetane, optionally inorganic nanoparticles, a second electrolyte and/or a solvent therefor, optionally polyester, and optionally a gelable polymeric component selected from poly(ethylene oxide), poly(ethylene glycol), poly(vinylidene fluoride), polyvinyl chloride, polystyrene, polyacrylonitrile, poly(vinyl acetate), polyvinylpyrrolidone, poly(divinyl sulfide), poly(trimethylene carbonate), poly(methyl methacrylate), poly(ethylene glycol dimethacrylate), polyoxypropylene, polydimethylsiloxane, prepolymer thereof, copolymer thereof, and mixtures thereof, a mass fraction of the gelable polymeric component in the gelable system being less than or equal to 1 wt %, wherein, in the gelable system, a mass fraction of the lithium salt is greater than or equal to 5 wt % and less than or equal to 60 wt %, a mass fraction of the ether compound is greater than or equal to 20 wt % and less than 60 wt %, a mass fraction of the second electrolyte and/or the solvent therefor is greater than or equal to 20 wt % and less than or equal to 75 wt %, a mass fraction of the inorganic nanoparticle is greater than or equal to 0 wt % and less than or equal to 30 wt %, and a mass fraction of the polyester is greater than or equal to 0 wt % and less than or equal to 30 wt %, or, in the gelable system, a mass fraction of the lithium salt is greater than or equal to 10 wt %, a mass fraction of the ether compound is greater than or equal to 60 wt % and less than or equal to 85 wt %, a mass fraction of the second electrolyte and/or the solvent therefor is greater than or equal to 5 wt % and less than or equal to 30 wt %, a mass fraction of the inorganic nanoparticle is greater than or equal to 0 wt % and less than or equal to 20 wt %, and a mass fraction of the polyester is greater than or equal to 0 wt % and less than or equal to 20 wt %, wherein the positive electrode comprises a cathode material selected from lithium cobalt oxide, lithium nickel oxide, lithium manganese oxide, ternary material nickel-cobalt-manganese oxide, barium magnesium manganese ore-type $MnO_2$ nanofibers, vanadium oxide, and iron oxychloride modified by aniline.

2. The preparation method according to claim 1, wherein, in the gelable system, the mass fraction of the gelable polymeric component is 0 wt %.

3. The method according to claim 1, wherein, in the gelable system, the mass fraction of polyester is 0 wt %.

4. The method according to claim 1, wherein, in the gelable system, the mass fraction of the nanoparticles is 0 wt %.

5. The method according to claim 1, wherein the gel electrolyte is heated to a temperature higher than a transition temperature thereof to become flowable.

6. The preparation method according to claim 1, wherein lithium manganese oxide is in nanocrystalline spinel $LiMn_2O_4$ or polypyrrole-coated spinel-type $LiMn_2O_4$ nanotubes.

7. The preparation method according to claim 1, wherein vanadium oxide is in a polypyrrole/$V_2O_5$ nanocomposite.

8. The preparation method according to claim 1, wherein each of the one or more positive electrodes or each of the one or more negative electrode is pressed into one piece under dry conditions.

9. The preparation method according to claim 1, wherein the second electrolyte and/or solvent therefor is selected from ether electrolytes and solvents thereof, ester electrolytes and solvents thereof, amide electrolytes and solvents thereof, nitrile electrolytes and solvents thereof, and sulfone electrolytes and solvents thereof.

10. The preparation method according to claim 1, wherein the lithium salt is one or more selected from the group consisting of lithium hexafluorophosphate, lithium tetrafluoroborate, lithium hexafluoroarsenate, lithium perchlorate, lithium trifluoromethanesulfonate, lithium perfluorobutanesulfonate, lithium bis(trifluoromethanesulfonyl)imide, lithium bis(fluorosulfonyl)imide, lithium aluminate, lithium chloroaluminate, lithium fluorosulfonyl imide, lithium chloride, and lithium iodide.

11. The method according to claim 1, wherein the mass fraction of the lithium salt is greater than or equal to 10 wt % and less than or equal to 40 wt %, the mass fraction of the ether compound is greater than or equal to 20 wt % and less than or equal to 60 wt %, the mass fraction of the second electrolyte and/or the solvent therefor is greater than or equal to 20 wt % and less than or equal to 60 wt %, the mass fraction of the inorganic nanoparticle is greater than 0 wt % and less than or equal to 20 wt %, and the mass fraction of the polyester is greater than 0 wt % and less than or equal to 20 wt %.

12. The preparation method according to claim 1, wherein the second electrolyte is a mixture of ethylene carbonate (EC) and dimethyl carbonate (DMC) containing 1 M lithium hexafluorophosphate ($LiPF_6$), and a volume ration of the ethylene carbonate (EC) to the dimethyl carbonate (DMC) is 1:1, or the second electrolyte is a mixture solution of 1,3-dioxolane (DOL) and ethylene glycol dimethyl ether (DME) containing 1 M lithium bis(trifluoromethanesulfonyl)imide (LiTFSI), and a volume ratio of the 1,3-dioxolane (DOL) to the ethylene glycol dimethyl ether (DME) is 1:1.

13. The preparation method according to claim 1, wherein, the second electrolyte is a solution of N, N-dimethylacetamide containing 1 M lithium trifluoromethanesulfonate, or the second electrolyte is a nitrile electrolyte that is an acetonitrile solution containing 1 M lithium perchlorate, or the second electrolyte is a sulfone electrolyte that is a dimethyl sulfoxide (DMSO) solution containing 1 M lithium perchlorate.

14. The preparation method according to claim 1, wherein the polyester is obtained by polycondensation between a polybasic acid or acid anhydride with a polyhydric alcohol, wherein the polybasic acid is selected from the group consisting of dibasic acids, tribasic acids, oxalic acid, malonic acid, succinic acid, butenedioic acid, glutaric acid, adipic acid, pimelic acid, suberic acid, sebacic acid, azelaic acid, and tricarballylic acid, substituted or unsubstituted, wherein the substitute is one or more selected from the group constituting of alkyl, cycloalkyl, aryl, hydroxy, amino, ester, halogen, acyl, aldehyde, thiol, and alkoxy, wherein the acid anhydride is selected from one or two or three or more than three of the following anhydrides which are substituted or unsubstituted: oxalic anhydride, malonic anhydride, succinic anhydride, maleic anhydride, glutaric anhydride, adipic anhydride, pimelic anhydride, suberic anhydride, sebacic anhydride, azelaic anhydride, hexahydrophthalic anhydride, and tetrahydrophthalic anhydride, substituted or unsubstituted, and wherein the polyhydric alcohol is one or more selected from the group consisting of polyethylene glycol, polyethylene glycol, propanediol, butanediol, pentanediol, hexanediol, heptanediol, octanediol, nonanediol, decanediol, polyethylene glycol, and glycerol, substituted or unsubstituted.

15. The preparation method according to claim 1, wherein the gelable system further comprises one or more cyclic ether compounds selected from